US012807210B2

(12) United States Patent
Soderlind et al.

(10) Patent No.: US 12,807,210 B2
(45) Date of Patent: Nov. 24, 2026

(54) METHODS AND APPARATUS TO CONTROL STOWABLE STEERING WHEELS

(71) Applicant: Ford Global Technologies, LLC, Dearborn, MI (US)

(72) Inventors: Erik William Soderlind, Harrison Township, MI (US); Taras Andrew Palczynski, Ann Arbor, MI (US); Alan Joseph Porter, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 18/356,649

(22) Filed: Jul. 21, 2023

(65) Prior Publication Data

US 2025/0026396 A1 Jan. 23, 2025

(51) Int. Cl.
*B62D 1/183* (2006.01)
*B62D 1/181* (2006.01)
*G07C 5/08* (2006.01)

(52) U.S. Cl.
CPC ............. *B62D 1/183* (2013.01); *B62D 1/181* (2013.01); *G07C 5/0816* (2013.01)

(58) Field of Classification Search
None
See application file for complete search history.

(56) References Cited

U.S. PATENT DOCUMENTS

| | | | | |
|---|---|---|---|---|
| 9,630,644 | B2 | 4/2017 | Soderlind | |
| 10,343,706 | B2 | 7/2019 | Lubischer et al. | |
| 10,351,160 | B2 | 7/2019 | Nash et al. | |
| 10,759,474 | B2 | 9/2020 | Christiansen | |
| 11,061,401 | B2 | 7/2021 | Koehler et al. | |
| 11,155,293 | B2 | 10/2021 | Hwang et al. | |
| 2014/0260761 | A1 | 9/2014 | Soderlind | |
| 2020/0130723 | A1* | 4/2020 | Cao | B62D 1/183 |
| 2021/0291890 | A1 | 9/2021 | Kreutz et al. | |
| 2022/0255474 | A1* | 8/2022 | Suzuki | H02P 5/60 |
| 2024/0069507 | A1* | 2/2024 | Wimme | H02P 29/60 |
| 2024/0157995 | A1* | 5/2024 | Specht | B62D 1/185 |
| 2024/0317297 | A1* | 9/2024 | Ku | B62D 1/181 |

OTHER PUBLICATIONS

Federal Motor Vehicle Safety Standards, "§ 571.118 Standard No. 118; Power-operated window, partition, and roof panel systems," Jul. 20, 2023, 6 pages.

* cited by examiner

*Primary Examiner* — Lail A Kleinman
(74) *Attorney, Agent, or Firm* — Lorne Forsythe; Hanley, Flight and Zimmerman, LLC

(57) ABSTRACT

Methods and apparatus to control stowable steering wheels are disclosed herein. An example apparatus disclosed herein includes a steering column assembly including a sensor, a first portion, and a second portion moveable relative to the first portion, machine readable instructions, and programmable circuitry to at least one of instantiate or execute the machine readable instructions to move the first portion relative to the second portion, determine based on an output of the sensor that the first portion has encountered an obstruction, and after determining the first portion has encountered the obstruction, stop a movement the first portion.

20 Claims, 11 Drawing Sheets

METHODS AND APPARATUS TO CONTROL STOWABLE STEERING WHEELS

FIELD OF THE DISCLOSURE

This disclosure relates generally to stowable steering wheels and, more particularly, to methods and apparatus to control stowable steering wheels.

BACKGROUND

A steering wheel is configured to change a driving direction of a vehicle based on a rotation of the steering wheel. For example, a driver rotating the wheel in a given direction causes a system of pivoted joints to interact, thereby transferring the rotational motion of the steering wheel into a pivoting motion of one or more road wheels. Known steering systems include rack and pinion systems. The rack and pinion systems rely on a gear wheel (e.g., a pinion) at the base of the steering column that causes a rack to translate from side to side, propagating the motion to the road wheels. Modern vehicle steering wheels can be configured to retract toward the dashboard to allow additional cabin space.

SUMMARY

An example apparatus disclosed herein includes a steering column assembly including a sensor, a first portion, and a second portion moveable relative to the first portion, machine readable instructions, and programmable circuitry to at least one of instantiate or execute the machine readable instructions to move the first portion relative to the second portion, determine based on an output of the sensor that the first portion has encountered an obstruction, and after determining the first portion has encountered the obstruction, stop a movement the first portion.

An example computer-readable medium disclosed herein includes instructions that, when executed, causes programmable circuitry to at least move a first portion of a steering column assembly relative to a second portion of the steering column assembly, determine based on a sensor output that the first portion has encountered an obstruction, and after determining the first portion has encountered the obstruction, stop a movement of the first portion.

An example method disclosed herein includes moving a first portion of a steering column assembly relative to a second portion of the steering column assembly, determining based on a sensor output that the first portion has encountered an obstruction, and after determining the first portion has encountered the obstruction, stopping a movement the first portion.

BRIEF DESCRIPTION OF THE DRAWINGS

In general, the same reference numbers will be used throughout the drawing(s) and accompanying written description to refer to the same or like parts. The figures are not necessarily to scale.

Figure 1:
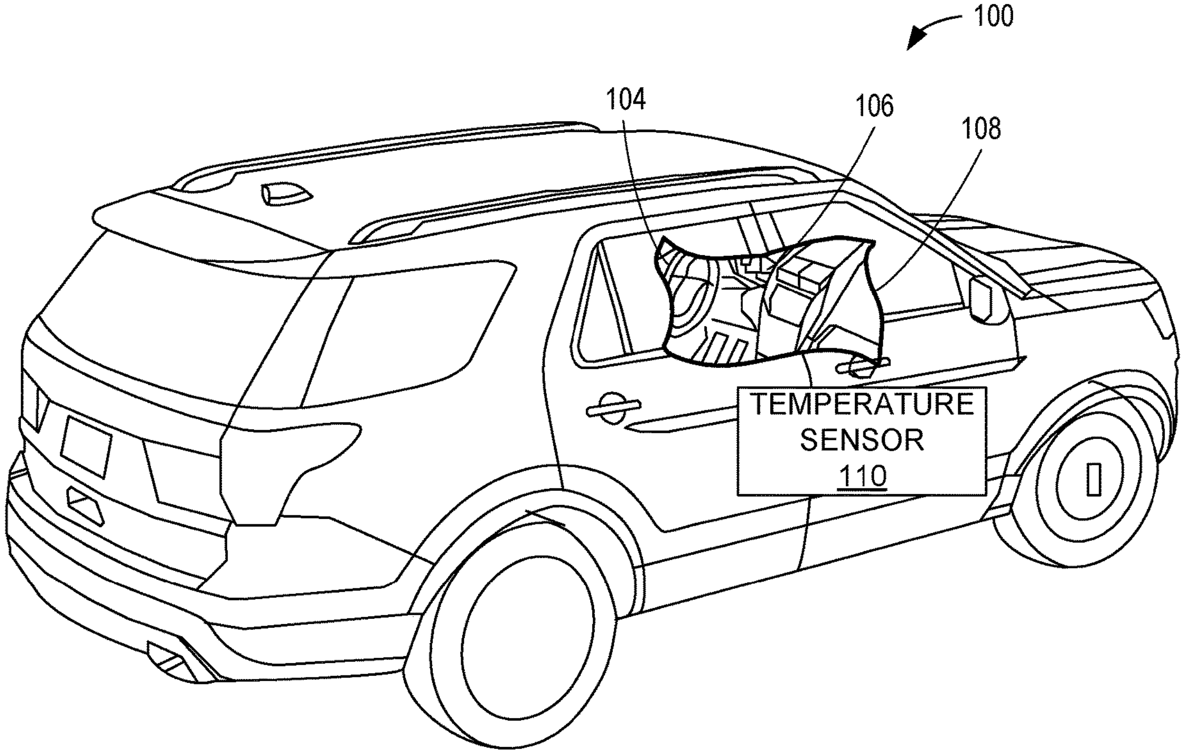
FIG. 1 depicts a vehicle in which examples disclosed herein can be implemented.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

In recent years, the range of positions of the steering wheels of stowable steering systems has increased. A steering column of a stowable steering system can move a steering wheel towards or away from an operator (e.g., away from or towards an instrument panel, etc.) based on operating conditions and/or a preference of the operator. Specifically, the steering column can move the steering wheel closer to an instrument panel in a stowed position to provide an operator with more room when the vehicle is not being driven. For example, the stowed position provides more room for ingress to and egress from the driver's seat. Additionally, the stowed position of a steering wheel provides additional space for working, entertainment (e.g., media presented on a screen of the dash, etc.), eating, and sleeping in the driver's seat while the vehicle is off or parked. When an operator of the vehicle is ready to drive, the steering column can move the steering wheel away from the instrument panel and towards the driver (e.g., from a stowed position to an operating position, etc.). Accordingly, the movement of the steering column and the steering wheel can provide additional space when needed while also enabling the operator to control the steering wheel in a comfortable position while driving.

Examples disclosed herein include stowable steering wheel systems that provide robust precise control of the steering wheel position and movement. Examples disclosed herein determine the position of the steering column and/or steering wheel via at least two independent techniques to determine if the position of the steering column is accurate. An example first technique described herein uses a mechanical sensor disposed on the steering column to determine the position of the steering wheel. In some examples disclosed herein, if the determined positions of the steering wheel do not satisfy a similarity threshold, the system can generate a warning for the operator(s) of the vehicle. An example second technique described herein uses a Hall effect sensor disposed on the electric motor of the steering system to determine the position of the steering column and/or steering wheel. Examples disclosed herein use pulse width modulation (PWM) to modify the speed of the steering wheel based on the determined position of the steering wheel and the commanded position of the steering wheel. Some examples disclosed herein include a steering control system that detects if an obstruction, such as a body part of an operator, is encountered by the steering wheel during movement and stops the movement of the steering wheel in response thereto.

As used herein, the orientation of some features is described with reference to a lateral axis, a vertical axis, and a longitudinal axis of the vehicle associated with the features. As used herein, the longitudinal axis of the vehicle is parallel to the centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, unless otherwise stated, the term "above" describes the relationship of two parts relative to Earth and the vertical axis. A first part is above a second part, if the second part has at least one part between Earth and the first part. Likewise, as used herein, a first part is "below" a second part when the first part is closer to the Earth than the second part. As used herein, the lateral axis of the vehicle is perpendicular to the longitudinal and vertical axes and is generally parallel to the axles of the vehicle.

As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein "substantially real time" refers to occurrence in a near instantaneous manner recognizing there may be real world delays for computing time, transmission, etc. Thus, unless otherwise specified, "substantially real time" refers to real time+1 second. In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.).

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s))) that may assign computing task(s) to whichever one(s) of the multiple types of programmable circuitry is/are suited and available to perform the computing task(s).

FIG. 1 illustrates an example vehicle 100 implemented in accordance with the teachings of this disclosure. In the illustrated example of FIG. 1, the example vehicle 100 includes an example steering wheel 104, an example instrument panel 106 (e.g., the dashboard, the dash, etc.), an example passenger cabin 108, and an example temperature sensor 110. In the illustrated example of FIG. 1, the example vehicle 100 is a sport utility vehicle (SUV). In other examples, the vehicle 100 can be any type of vehicle (e.g., a van, a coup, a sedan, a pick-up truck, a semi-trailer truck, a mini-van a railed vehicle, an all-terrain vehicle (ATV), watercraft, construction equipment, farming equipment, etc.). In the illustrated example of FIG. 1, the vehicle 100 is a two-axle vehicle. In other examples, the vehicle 100 can have additional axles and/or additional wheels. The example vehicle 100 can have a body-on-frame construction and/or a unibody construction.

The steering wheel 104 is movable (e.g., translatable, slidable, etc.) between a first position (e.g., a stowed position, etc.) and a second position (e.g., an operating position, etc.). When the steering wheel 104 is in the first position, a person sitting in the driver seat of the vehicle 100 has additional space within the passenger cabin 108. For example, when the steering wheel 104 is in the stowed position, the additional room in the passenger cabin 108 enables a driver to enter and exit the vehicle 100 more easily and/or perform activities, such as reading, writing, sleeping, or eating when the vehicle 100 is parked. The steering wheel 104 can be positioned further from the instrument panel 106 and closer to the rear of the vehicle 100 in the operating position to enable the driver to operate (e.g., rotate, etc.) the steering wheel 104 while in a comfortable position.

The temperature sensor 110 is a device that outputs a digital value indicative of a temperature associated with the vehicle 100. For example, the temperature sensor 110 can output a value corresponding to an interior temperature of the vehicle 100 (e.g., a temperature within the passenger cabin 108 of the vehicle 100, etc.). In some such examples, the temperature sensor 110 can be associated with a climate control system of the vehicle 100 (e.g., a heater of the vehicle 100, an air conditioner of the vehicle 100, etc.). In some examples, the temperature sensor 110 can be disposed under a passenger seat or a driver seat of the vehicle 100 (e.g., if the vehicle 100 has independent temperature control for the passenger seat and driver seat, etc.). Additionally or alternatively, the temperature sensor 110 can output a sensor value corresponding to a temperature within the steering system associated with the steering wheel 104 and/or an ambient temperature of the vehicle 100.

Figure 2:
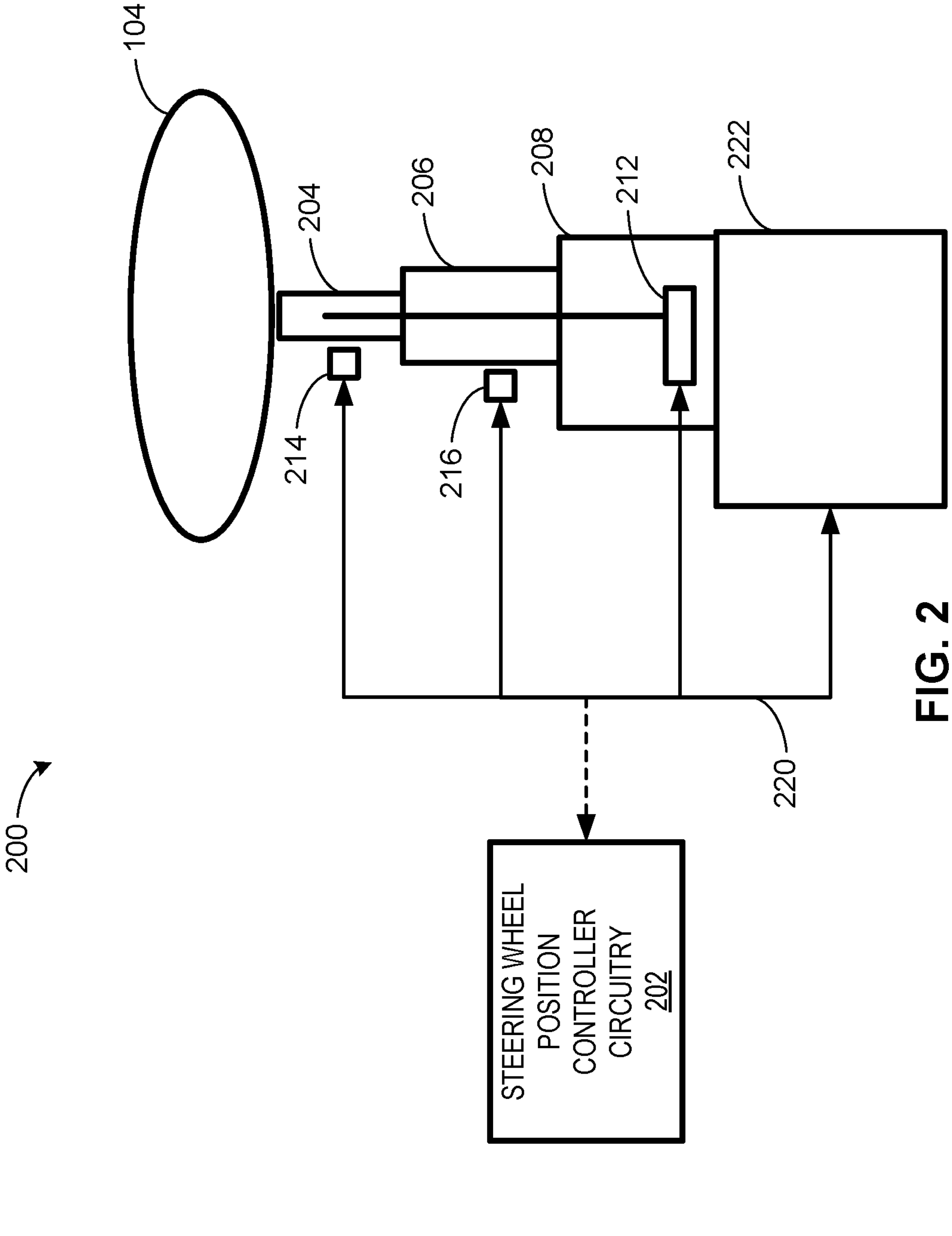
FIG. 2 is a schematic diagram of a steering system including the steering wheel of FIG. 1.

FIG. 2 is a schematic diagram of an example moveable steering column assembly 200 including the steering wheel 104 of FIG. 1. In the illustrated example of FIG. 2, the example moveable steering column assembly 200 is controlled by example steering wheel position controller circuitry 202. In the illustrated example of FIG. 2, the moveable steering column assembly 200 includes an example first portion 204, an example second portion 206, an example housing 208, and an example motor 212. In the illustrated example of FIG. 2, the example moveable steering column assembly 200 includes an example first sensor 214 and an example second sensor 216, both of which communicates with the steering wheel position controller circuitry 202 via an example bus 220. In the illustrated example of FIG. 2, the moveable steering column assembly 200 includes an example feedback actuator assembly 222.

The first portion 204 and the second portion 206 are components of the steering column of the vehicle 100. The example first portion 204 is the moveable portion of the moveable steering column assembly 200. In some examples, the first portion 204 is an upper jacket of the moveable steering column assembly 200 and the second portion 206 is a lower jacket of the moveable steering column assembly 200. The first portion 204 is rigidly coupled to the steering wheel 104, which enables the first portion 204 to move with the steering wheel 104 during operation. The example second portion 206 is mechanically coupled to the first portion 204 and enables relative movement thereof. In some examples, the example second portion 206 is a lower jacket of the moveable steering column assembly 200. For example, the first portion 204 can be coupled to the second portion 206 via an example rack system that enables the first portion 204 to move into and out of the second portion 206 (e.g., be stowed within the second portion 206, etc.). In some such examples, the first portion 204 is telescopically coupled to the second portion 206. An example configuration of the first portion 204, the second portion 206, and the housing 208 are described below in conjunction with FIG. 3.

The motor 212 applies a force that moves the first portion 204 relative to the second portion 206 during the operation of the moveable steering column assembly 200. For example, the motor 212 can be implemented by any suitable type of electric motor (e.g., a universal motor, an AC motor, a brushless DC motor, etc.). In some examples, the motor 212 is a rotary motor. In some such examples, the moveable steering column assembly 200 can include a gear assembly that converts the generated torque of the motor 212 into a linear translation of the first portion 204 relative to the second portion 206. In some examples, the motor 212 can be powered via one or more batteries of the vehicle 100 (e.g., a starting, lighting, and ignition (SLI) battery of the vehicle 100, a battery of a battery electric vehicle (BEV), etc.).

The first sensor 214 measures the position of the first portion 204 relative to the second portion 206. For example, the first sensor 214 can be implemented by a mechanical sensor (e.g., a slide sensor, a spring sensor, etc.) coupled to the first portion 204 and/or the second portion 206. Additionally or alternatively, the first sensor 214 can be implemented by any other suitable sensor(s) (e.g., one or more optical sensor(s), one or more potentiometer(s), one or more linear Hall-effect sensor(s), one or more magnetostrictive sensor(s), one or more linear encoder(s), one or more inductive sensor(s), etc.). In some examples, because the second portion 206 is fixedly coupled to the housing 208, which is fixedly coupled to the vehicle 100 (e.g., to a frame of the vehicle 100, to a body of the vehicle 100, etc.), the first sensor 214 outputs the absolute position of the first portion 204 within the vehicle 100. In some such examples, the output of the first sensor 214 can be used by the steering wheel position controller circuitry 202 to determine the absolute position of the first portion 204 within the vehicle 100. Example outputs of the first sensor 214 are described below in conjunction with FIGS. 5 and 6.

The second sensor 216 measures the position of the motor 212. For example, the second sensor 216 can include a Hall-effect sensor that measures each rotation of the motor 212 (e.g., each pulse of the motor 212, etc.). In other examples, the second sensor 216 can be implemented by any other suitable sensor that measures the rotation of the motor 212 (e.g., an optical sensor, a mechanical sensor, a potentiometer, an encoder, an induction sensor, etc.). In some examples, because the movement of the first portion 204 is linearly proportionate to the rotation of the motor 212 (e.g., a single rotation of the motor 212 causes a fixed amount of movement of the first portion 204, etc.), the output of the second sensor 216 can be used to monitor the position of the first portion 204 relative to a previous position of the first portion 204. In some such examples, the output of the second sensor 216 can be used by the steering wheel position controller circuitry 202 to determine the relative position of the first portion 204. Example outputs of the second sensor 216 are described below in conjunction with FIGS. 5 and 6.

In the illustrated example of FIG. 2, the steering wheel position controller circuitry 202, the motor 212, and the sensors 214, 216 communicate via the bus 220. In some examples, the bus 220 can be implemented by the controller area network (CAN) bus of the vehicle 100. In other examples, the bus 220 can be implemented by any other suitable system. In other examples, the bus 220 can be absent. In some such examples, the steering wheel position controller circuitry 202, the motor 212, and/or the sensors 214, 216 can communicate via a wireless connection.

In the illustrated example of FIG. 2, the moveable steering column assembly 200 includes the feedback actuator assembly 222. The feedback actuator assembly 222 provides tactile feedback to an operator of the moveable steering column assembly 200. In some such examples, the feedback actuator assembly 222 can be used in a steer-by-wire system to compensate for a lack of tactile feedback associated with the mechanical connection between the steering wheel 104 and a steering gear of the vehicle 100. In some examples, the motor 212 can be a component of the feedback actuator assembly 222. In some such examples, the feedback actuator assembly 222 can be absent. In some such examples, the steering wheel position controller circuitry 202 can be a component of an electric control unit (ECU) associated with the feedback actuator assembly 222.

Figure 3:
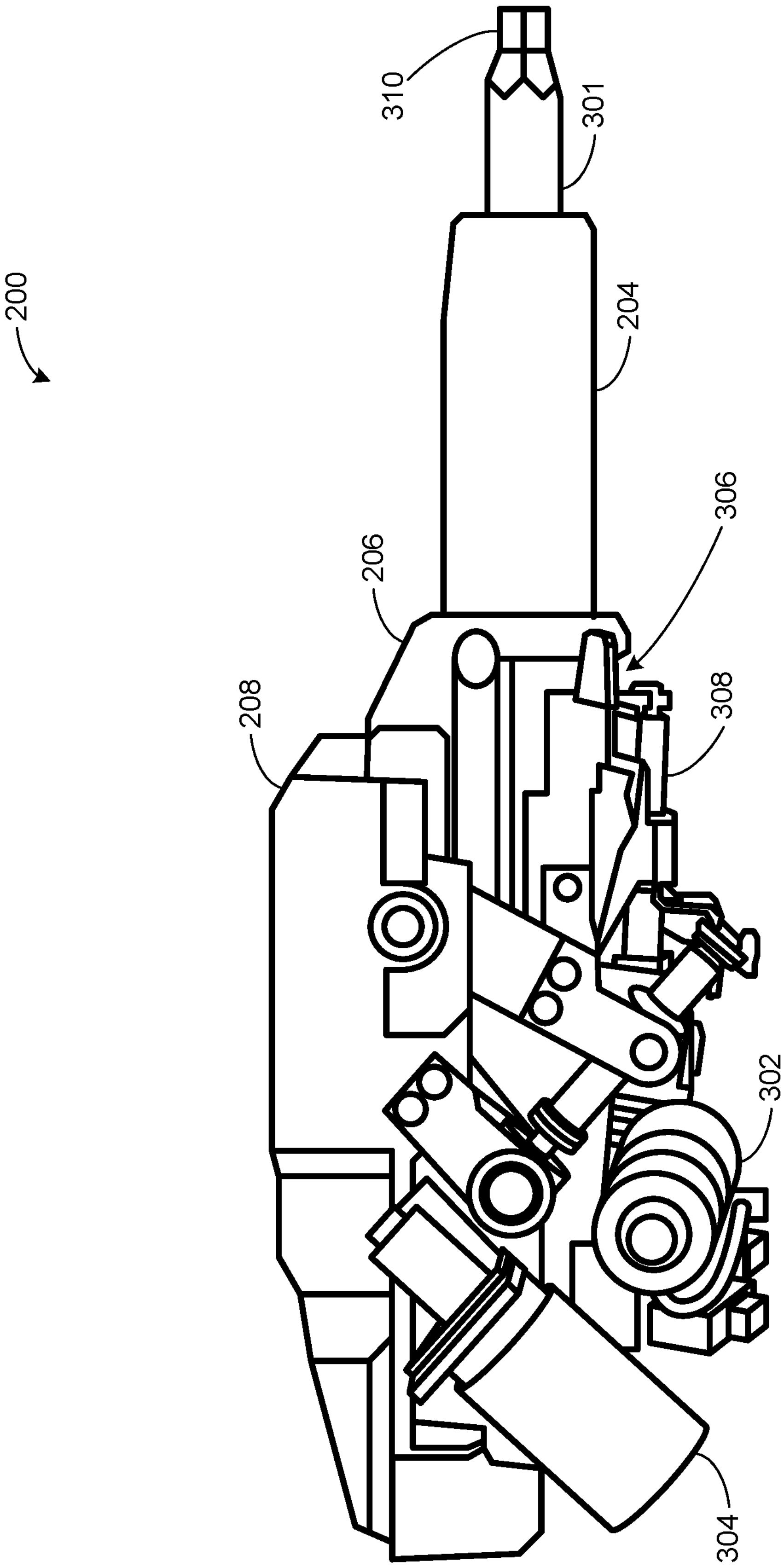
FIG. 3 is a perspective view of the steering system of the vehicle of FIG. 1.

FIG. 3 is a perspective view of the moveable steering column assembly 200 of FIG. 2 of the vehicle 100 of FIG. 1. In the illustrated example of FIG. 3, the moveable steering column assembly 200 includes the first portion 204 of FIG. 2, the second portion 206 of FIG. 2, the housing 208 of FIG. 2, an example steering shaft 301, an example first actuator 302, an example second actuator 304, and an example gear system 306.

During operation, the first actuator 302 causes the first portion 204 to translate relative to the second portion 206. In the illustrated example of FIG. 3, the first actuator 302 includes the motor 212 of FIG. 2 and an example leadscrew 308. The gear system 306 facilitates the relative movement of the first portion 204 and the second portion 206. In some examples, the gear system 306 can be implemented by a rack and pinion system coupling the first portion 204 and the second portion 206. In some examples, the first sensor 214 of FIG. 2 can be implemented by a sensor (e.g., a mechanical sensor, etc.) coupled to the gear system 306.

During operation, the rotation of the motor 212 causes the rotation of the leadscrew 308, which causes the operation of the gear system 306 and the relative movement of the first portion 204 and the second portion 206. In other examples, the leadscrew 308 and the gear system 306 can be absent. In some such examples, the motor 212 can cause the relative movement of the first portion 204 and the second portion 206 by any other suitable means. The rotation of the motor 212 causes the operation of the first actuator 302 and the longitudinal movement of the first portion 204 relative to the second portion 206. In the illustrated example, the relationship between the rotational distance of the motor 212 and the displacement of the first portion 204 relative to the second portion 206 is mechanically fixed (e.g., not variable, etc.) and based on the gearing of the leadscrew 308 and the gear system 306. As such, the steering wheel position controller circuitry 202 can determine the position of the first portion 204 relative to the second portion 206 by monitoring the rotation of the motor 212 (e.g., via the second sensor 216 of FIG. 2, etc.).

During operation, the second actuator 304 controls the position of the first portion 204. In some examples, the operation of the second actuator 304 controls the elevation of the first portion 204 (e.g., the vertical position of the steering wheel 104 within the passenger cabin 108, the height of the steering wheel 104 within the vehicle 100, etc.). In some examples, the second actuator 304 can be absent.

The steering shaft 301 is rotatably coupled within the first portion 204. In the illustrated example of FIG. 3, the steering shaft 301 is concentric with the first portion 204. In other examples, the steering shaft 301 and the first portion 204 can have any other suitable relationship. As such, the operation of the first actuator 302 controls the longitudinal location of the first portion 204 (e.g., the axial location of the first portion 204, a distance between the steering wheel 104 and the instrument panel 106, etc.). In the illustrated example of FIG. 3, the steering shaft 301 includes an example end 310. In some examples, a steering wheel (e.g., the steering wheel 104 of FIGS. 1 and 2, etc.) can be coupled to the end 310. During operation, the steering shaft 301 can rotate within the first portion 204 and is otherwise fixed to the first portion 204. In some such examples, as the first portion 204 moves relative to the second portion 206, the steering shaft 301 moves with the first portion 204, which enables the position of the steering wheel 104 to be controlled via the operation of the moveable steering column assembly 200.

Figure 4:
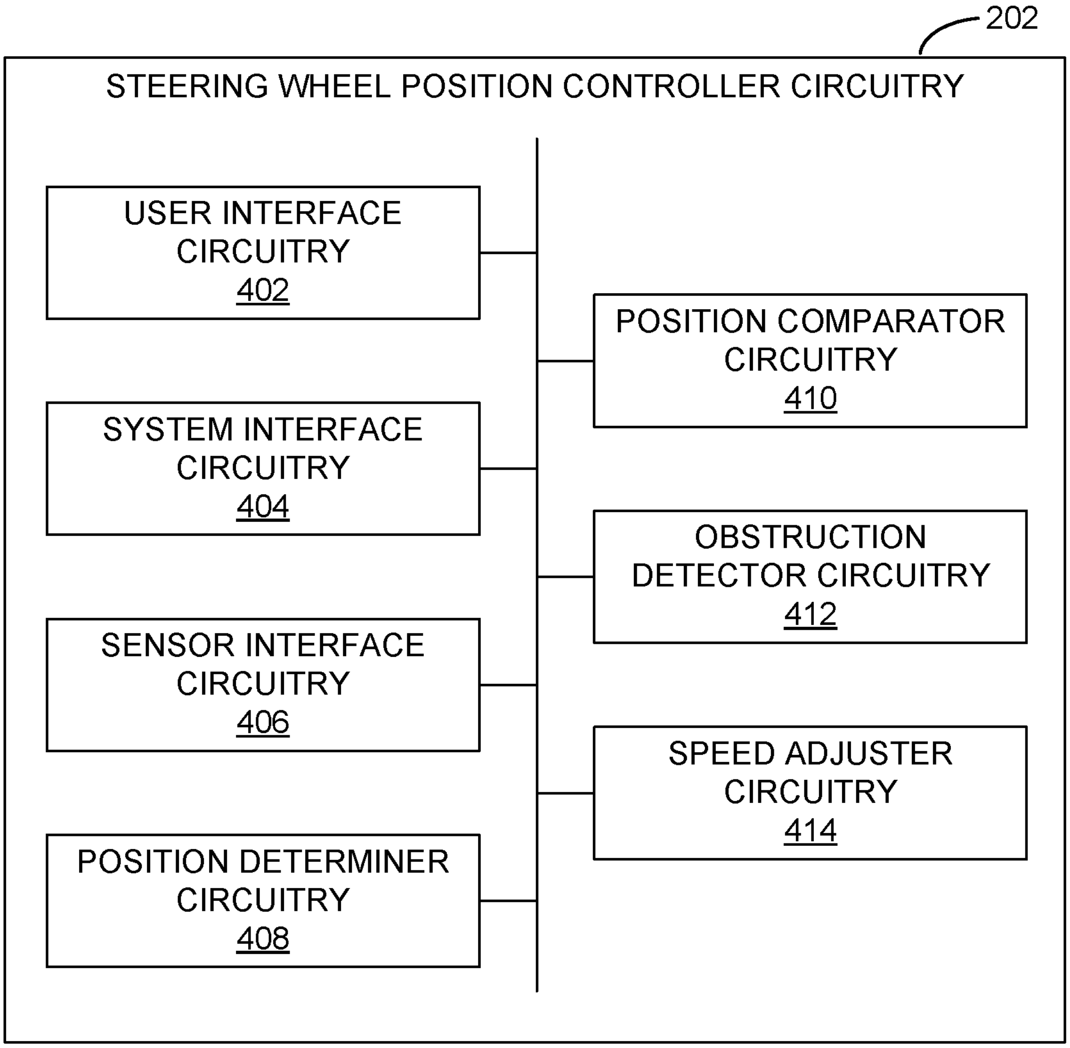
FIG. 4 is a block diagram of an example implementation of the steering wheel position controller circuitry of FIG. 1.

FIG. 4 is a block diagram of an example implementation of the steering wheel position controller circuitry 202 of FIG. 2 to control the operation of the moveable steering column assembly 200 of FIGS. 2 and 3. In the illustrated example of FIG. 4, the steering wheel position controller circuitry 202 includes example user interface circuitry 402, example system interface circuitry 404, example sensor interface circuitry 406, example position determiner circuitry 408, example position comparator circuitry 410, example obstruction detector circuitry 412, and example speed adjuster circuitry 414. The steering wheel position controller circuitry 202 may be instantiated (e.g., creating an instance of, bring into being for any length of time, materialize, implement, etc.) by programmable circuitry such as a Central Processor Unit (CPU) executing first instructions. Additionally or alternatively, the steering wheel position controller circuitry 202 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

The user interface circuitry 402 accesses inputs from an interface of the vehicle 100. For example, the user interface circuitry 402 can access a request to move the longitudinal position of the steering wheel 104 within the passenger cabin 108 of the vehicle 100 (e.g., a request to stow the steering wheel 104, a request to unstow the steering wheel 104, etc.). In some examples, the user interface circuitry 402 can detect an input via the steering wheel 104 (e.g., via a button disposed thereon, etc.) and/or an interface of the instrument panel 106 (e.g., via a button on the instrument panel 106, via a touch screen of the instrument panel 106, etc.). In some examples, the user interface circuitry 402 can generate a request to move the longitudinal position in response to another user input (e.g., an ignition of the vehicle 100, an adjustment of a driver seat of the vehicle 100, etc.). In some examples, the user interface circuitry 402 can detect a request to move the longitudinal position of the steering wheel 104 from an autonomous driving system of the vehicle 100, etc.

In some examples, the user interface circuitry 402 can generate an alert indicating a discrepancy has occurred in the moveable steering column assembly 200. For example, the user interface circuitry 402 can generate an alert based on a command from the position comparator circuitry 410. Additionally or alternatively, the user interface circuitry 402 can generate an alert in response to a command from an obstruction detector circuitry 412. In some examples, the user interface circuitry 402 can generate a visual alert (e.g., via a dashboard indicator/warning light, an indicator on the steering wheel 104, a screen of the vehicle 100, a screen of a user device of a user of the vehicle 100, etc.), an audio alert (e.g., via a speaker of the vehicle 100, via a speaker of a user device of a user of the vehicle 100, etc.) and/or tactile feedback (e.g., tactile feedback via a seat of the vehicle 100, tactile feedback via the steering wheel 104, etc.). In some examples, the user interface circuitry 402 can generate an alert indicating the vehicle 100 needs to be serviced to address the detected discrepancy. In some examples, the user interface circuitry 402 is instantiated by programmable circuitry executing user interface instructions and/or configured to perform operations such as those represented by the flowcharts of FIGS. 7 and 8.

In some examples, the steering wheel position controller circuitry 202 includes means for interfacing with a user. For example, the means for interfacing with a user may be implemented by the user interface circuitry 402. In some examples, the user interface circuitry 402 may be instantiated by programmable circuitry such as the example programmable circuitry 912 of FIG. 9. For instance, the user interface circuitry 402 may be instantiated by the example microprocessor 1000 of FIG. 10 executing machine executable instructions such as those implemented by at least blocks 702, 713, 720 of FIG. 7. In some examples, the user interface circuitry 402 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the user interface circuitry 402 may be instantiated by any other combination of hardware, software, and/or firmware. For example, the user interface circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The system interface circuitry 404 controls the operation of the first actuator 302 of FIG. 3 and/or the second actuator 304 of FIG. 3 to move the steering wheel 104 of FIGS. 1 and 2 into a target position. For example, the system interface circuitry 404 can initiate movement of the steering wheel 104 based on a command accessed by the user interface circuitry 402. For example, the system interface circuitry 404 can cause the operation of the first actuator 302 of FIG. 3 and the motor 212 of FIGS. 2 and 3 to cause the longitudinal translation of the first portion 204 of the moveable steering column assembly 200 relative to the second portion 206 of the moveable steering column assembly 200. In some such examples, the system interface circuitry 404 can send a command to the first actuator 302 (e.g., an electrical signal, etc.) to begin rotating the motor 212 in a direction corresponding to the accessed command (e.g., a first direction to move the steering wheel 104 towards the instrument panel 106, a second direction to move the steering wheel away from the instrument panel 106, etc.). In some examples, the system interface circuitry 404 can stop operating the actuator 302 in response to the obstruction detector circuitry 412 detecting an obstruction and/or the position determiner circuitry 408 determining the target position has been reached. In some examples, the system interface circuitry 404 is instantiated by programmable circuitry executing system interface instructions and/or configured to perform operations such as those represented by the flowcharts of FIGS. 7 and 8.

In some examples, the steering wheel position controller circuitry 202 includes means for interfacing with a moveable steering system. For example, the means for interfacing with a moveable steering system may be implemented by the system interface circuitry 404. In some examples, the system interface circuitry 404 may be instantiated by programmable circuitry such as the example programmable circuitry 912 of FIG. 9. For instance, the system interface circuitry 404 may be instantiated by the example microprocessor 1000 of FIG. 10 executing machine executable instructions such as those implemented by at least blocks 704, 718 of FIG. 7. In some examples, the system interface circuitry 404 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the system interface circuitry 404 may be instantiated by any other combination of hardware, software, and/or firmware. For example, the system interface circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The sensor interface circuitry 406 accesses, requests, and/or receives sensor data from sensors associated with the sensors of the vehicle 100. For example, the sensor interface circuitry 406 can receive sensor data from the temperature sensor 110 of FIG. 1, the first sensor 214 of FIG. 2, and/or the second sensor 216. In some examples, the sensor interface circuitry 406 can access sensor data from other sensors of the vehicle 100 (e.g., another temperature sensor of the vehicle 100, etc.). In some examples, the sensor interface circuitry 406 can convert the data received from the sensors 110, 214, 216 into a numerical form (e.g., human-readable, etc.). In some examples, the sensor interface circuitry 406 is instantiated by programmable circuitry executing sensor interface circuitry instructions and/or configured to perform operations such as those represented by the flowcharts of FIGS. 7 and 8.

In some examples, the steering wheel position controller circuitry 202 includes means for sensor interfacing. For example, the means for determining may be implemented by the sensor interface circuitry 406. In some examples, the sensor interface circuitry 406 may be instantiated by programmable circuitry such as the example programmable circuitry 912 of FIG. 9. For instance, the sensor interface circuitry 406 may be instantiated by the example microprocessor 1000 of FIG. 10 executing machine executable instructions such as those implemented by at least block 706 of FIG. 7 and block 802 of FIG. 8. In some examples, the sensor interface circuitry 406 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the sensor interface circuitry 406 may be instantiated by any other combination of hardware, software, and/or firmware. For example, the sensor interface circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The position determiner circuitry 408 determines the position of the first portion 204 and/or the steering wheel 104 of the moveable steering column assembly 200. For example, the position determiner circuitry 408 can determine the position of the first portion 204 relative to the second portion 206 using sensor data from the first sensor 214 and/or the second sensor 216 accessed by the sensor interface circuitry 406. For example, the position determiner circuitry 408 can use sensor information from the first sensor 214 (e.g., a mechanical sensor, etc.) to determine the position of the first portion 204 relative to the second portion 206. Additionally or alternatively, the position determiner circuitry 408 can determine a position using sensor information from the second sensor 216 (e.g., a Hall effect sensor coupled to the motor 212, etc.). In some such examples, the position determiner circuitry 408 can determine the position of the first portion 204 based on a starting position of the first portion 204 and a quantity (e.g., a number, etc.) of rotations of the motor 212. In some examples, the position determiner circuitry 408 is instantiated by programmable circuitry executing position determiner instructions and/or configured to perform operations such as those represented by the flowcharts of FIGS. 7 and 8.

In some examples, the steering wheel position controller circuitry 202 includes means for determining the position of a portion of a steering system. For example, the means for determining the position of a portion of a steering system may be implemented by the position determiner circuitry 408. In some examples, the position determiner circuitry 408 may be instantiated by programmable circuitry such as the example programmable circuitry 912 of FIG. 9. For instance, the position determiner circuitry 408 may be instantiated by the example microprocessor 1000 of FIG. 10 executing machine executable instructions such as those implemented by at least blocks 708, 710, 726 of FIG. 7. In some examples, the position determiner circuitry 408 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the position determiner circuitry 408 may be instantiated by any other combination of hardware, software, and/or firmware. For example, the position determiner circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The position comparator circuitry 410 determines if the difference between the estimated position satisfies a threshold. For example, the position comparator circuitry 410 can compare the first estimated position and the second estimated position to determine an absolute difference between the estimated positions and/or a relative difference between the estimated position values. In some examples, the threshold can be based on a user preference, a manufacturer setting, and/or a geometric property of the vehicle 100. In some such examples, the position comparator circuitry 410 can access the threshold from a memory associated with the vehicle 100. Additionally or alternatively, the threshold can be an absolute value (e.g., 10 millimeters, 1 centimeter, etc.). In other examples, the threshold can be a percentage (e.g., a maximum percentage difference between the first estimated position and the second estimated position, etc.). In some examples, the position comparator circuitry 410 is instantiated by programmable circuitry executing the position comparator instructions and/or configured to perform operations such as those represented by the flowcharts of FIGS. 7 and 8.

In some examples, the steering wheel position controller circuitry 202 includes means for comparing positions. For example, the means for comparing positions may be implemented by the position comparator circuitry 410. In some examples, the position comparator circuitry 410 may be instantiated by programmable circuitry such as the example programmable circuitry 912 of FIG. 9. For instance, the position comparator circuitry 410 may be instantiated by the example microprocessor 1000 of FIG. 10 executing machine executable instructions such as those implemented by at least block 712 of FIG. 7. In some examples, the position comparator circuitry 410 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the position comparator circuitry 410 may be instantiated by any other combination of hardware, software, and/or firmware. For example, the position comparator circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The example obstruction detector circuitry 412 determines if the moveable steering column assembly 200 has encountered an obstruction during operation. For example, the obstruction detector circuitry 412 can determine if the steering wheel 104 has contacted an object (e.g., cargo, an operator of the vehicle 100, etc.) in the passenger cabin 108 of the vehicle 100 during a stowing or deploying movement. In some examples, the obstruction detector circuitry 412 can detect an obstruction by determining if a parameter of the motor 212 is within an expected range of parameters associated with normal, non-stalled operation of the motor 212. For example, the obstruction detector circuitry 412 can determine if a current draw of the motor 212 is within a range of draw currents for the motor 212. Additionally or alternatively, the obstruction detector circuitry 412 can determine if a motor parameter that is proportional to the drawn current of the motor 212 (e.g., output motor force, motor power, motor torque, etc.) is within a range. In some examples, if the motor parameter is not within the range, the obstruction detector circuitry 412 can determine an obstruction has been encountered and caused the system interface circuitry 404 to stop the operation of the moveable steering column assembly 200.

In some examples, the obstruction detector circuitry 412 can dynamically determine a range of motor parameters corresponding to unobstructed movement of the first portion 204 (e.g., normal, non-stalled operation of the motor 212, etc.) based on a temperature of the moveable steering column assembly 200. In some such examples, the temperature of the moveable steering column assembly 200 can, via thermal expansion and/or temperature-based viscosity changes of lubricant, change the range of motor parameter values associated with the normal non-stalled operation of the motor 212. In some examples, the obstruction detector circuitry 412 can determine the motor parameter range based on a look-up table stored in a memory associated with the vehicle 100. In some such examples, the look-up table used by the obstruction detector circuitry 412 can be generated experimentally and/or analytically. In other examples, the obstruction detector circuitry 412 can determine the range analytically (e.g., via an expected thermal expansion of components, via an expected viscosity change of a lubricant of the moveable steering column assembly 200, etc.).

In some examples, if the parameter exceeds the parameter range, the obstruction detector circuitry 412 can determine if an inrush current of the motor 212 and not indicate an obstruction has occurred if the motor 212 is experiencing an inrush current. Additionally or alternatively, if the parameter exceeds the parameter range, the obstruction detector circuitry 412 can determine if the motor 212 is stalling due to an end of travel of the moveable steering column assembly 200 and not indicate an obstruction has occurred if the motor 212 is experiencing such a stall. In some examples, the obstruction detector circuitry 412 is instantiated by programmable circuitry executing obstruction detector instructions and/or configured to perform operations such as those represented by the flowcharts of FIGS. 7 and 8.

In some examples, the steering wheel position controller circuitry 202 includes means for detecting an obstruction. For example, the means for detecting an obstruction may be implemented by the obstruction detector circuitry 412. In some examples, the obstruction detector circuitry 412 be instantiated by programmable circuitry such as the example programmable circuitry 912 of FIG. 9. For instance, the obstruction detector circuitry 412 may be instantiated by the example microprocessor 1000 of FIG. 10 executing machine executable instructions such as those implemented by at least block 716 of FIG. 7 and/or blocks 804, 806, 808, 810, 812, 814 of FIG. 8. In some examples, the obstruction detector circuitry 412 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the obstruction detector circuitry 412 may be instantiated by any other combination of hardware, software, and/or firmware. For example, the obstruction detector circuitry 412 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The speed adjuster circuitry 414 adjusts the speed of translation of the steering wheel 104. For example, the speed adjuster circuitry 414 can adjust the speed of translation of the first portion 204 is to be adjusted based on a current position of the steering wheel 104, a user preference, and/or a manufacturer setting. In some examples, the speed adjuster circuitry 414 can adjust the speed of translation via pulse width modulation (PWM). In some examples, the speed adjuster circuitry 414 can adjust the speed of translation to a speed between a lower speed value (e.g., approximately 11 millimeters per second, etc.) and an upper speed value (e.g., approximately 44 millimeters per second, etc.). In some examples, the speed adjuster circuitry 414 can increase the speed of translation when the steering wheel 104 is not near the target position and/or decrease the speed of translation when the steering wheel 104 is near the target position. In some examples, the speed adjuster circuitry 414 can adjust the speed of translation to reduce loudness and/or sound fluctuations of the moveable steering column assembly 200 (e.g., prevent large changes in torque applied to the gear system 306 of the moveable steering column assembly 200, etc.). In some examples, the speed adjuster circuitry 414 is instantiated by programmable circuitry executing speed adjuster instructions and/or configured to perform operations such as those represented by the flowcharts of FIGS. 7 and 8.

In some examples, the steering wheel position controller circuitry 202 includes means for adjusting a speed of moveable steering system. For example, the means for adjusting a speed of moveable steering system may be implemented by the speed adjuster circuitry 414. In some examples, the speed adjuster circuitry 414 may be instantiated by programmable circuitry such as the example programmable circuitry 912 of FIG. 9. For instance, the speed adjuster circuitry 414 may be instantiated by the example microprocessor 1000 of FIG. 10 executing machine executable instructions such as those implemented by at least blocks 722, 724 of FIG. 7. In some examples, the speed adjuster circuitry 414 may be instantiated by hardware logic circuitry, which may be implemented by an ASIC, XPU, or the FPGA circuitry 1100 of FIG. 11 configured and/or structured to perform operations corresponding to the machine readable instructions. Additionally or alternatively, the speed adjuster circuitry 414 may be instantiated by any other combination of hardware, software, and/or firmware. For example, the speed adjuster circuitry 414 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the steering wheel position controller circuitry 202 of FIG. 2 is illustrated in FIG. 4, one or more of the elements, processes, and/or devices illustrated in FIG. 4 may be combined, divided, re-arranged, omitted, eliminated, and/or implemented in any other way. Further, the example user interface circuitry 402, the example system interface circuitry 404, the example sensor interface circuitry 406, the example position determiner circuitry 408, the example position comparator circuitry 410, example obstruction detector circuitry 412, the speed adjuster circuitry 414 and/or, more generally, the example steering wheel position controller circuitry 202 of FIG. 4, may be implemented by hardware alone or by hardware in combination with software and/or firmware. Thus, for example, any of the example user interface circuitry 402, the example system interface circuitry 404, the example sensor interface circuitry 406, the example position determiner circuitry 408, the example position comparator circuitry 410, example obstruction detector circuitry 412, the speed adjuster circuitry 414, and/or, more generally, the example steering wheel position controller circuitry 202, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example steering wheel position controller circuitry 202 of FIG. 4 may include one or more elements, processes, and/or devices in addition to, or instead of, those illustrated in FIG. 4, and/or may include more than one of any or all of the illustrated elements, processes and devices.

Figure 5:
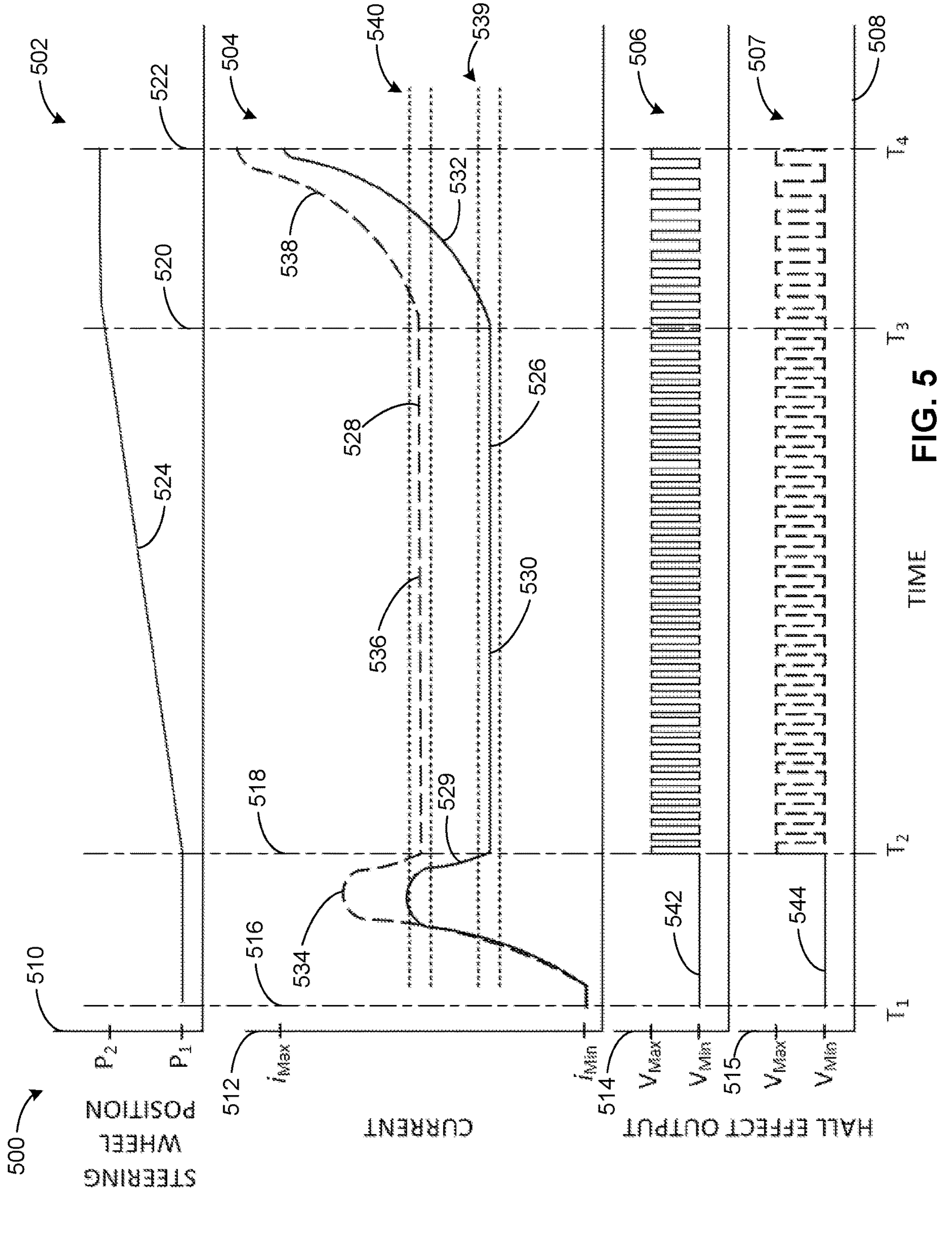
FIG. 5 is an example current, steering wheel position, and motor position graph during normal operation.

FIG. 5 illustrates an example relationship 500 between parameters of the moveable steering column assembly 200 of FIGS. 2 and 3 during a full travel operation (e.g., movement from a fully deployed position to a fully stowed position, etc.). The example relationship 500 includes an example first graph 502, an example second graph 504, an example third graph 506, and an example fourth graph 507. In the illustrated example of FIG. 5, the graphs 502, 504, 506 have an example x-axis 508. In the illustrated example of FIG. 5, the first graph 502, the second graph 504, the third graph 506, and the fourth graph 507 have an example first y-axis 510, an example second y-axis 512, an example third y-axis 514, and an example fourth y-axis 515, respectively.

The x-axis 508 measures the independent variable time. In the illustrated example of FIG. 5, an example first time 516 ($T_1$), an example second time 518 ($T_2$), an example third time 520 ($T_3$), and an example fourth time 522 ($T_4$) are marked on the x-axis 508. In some examples, the elapsed time between $T_1$ and $T_4$ depends on how quickly the moveable steering column assembly 200 is translating and the total travel of the moveable steering column assembly 200. The x-axis 508 can have any suitable units of measurement (e.g., milliseconds, seconds, etc.). The durations between respective ones of the times 516, 518, 520, 522 are for illustrative purposes only. In other examples, the distance between times 516, 518, 520, 522 can be different (e.g., the distance between the second time 518 and the third time 520, etc.).

The first y-axis 510 of the first graph 502 measures the position of the first portion 204 of FIG. 2 and/or the steering wheel 104 of FIGS. 1 and 2. In the illustrated example of FIG. 5, a value of $P_1$ on the first y-axis 510 indicates that moveable steering column assembly 200 is in the fully-stowed state and $P_2$ indicates the moveable steering column assembly 200 is in the fully deployed state. In some examples, the first y-axis 510 can have any suitable units of distance (e.g., millimeters, inches, etc.). In some examples, the y-axis can have relative distance units (e.g., a percentage position between fully stowed and fully deployed, etc.).

The second y-axis 512 of the second graph 504 measures the current draw of the motor 212. In the illustrated example of FIG. 5, the second y-axis 512 extends between $i_{min}$ and $i_{max}$, which is the maximum rated current of the motor 212. In some examples, the second y-axis 512 can have any suitable units of current (e.g., amps, etc.). The third y-axis 514 of the third graph 506 and the fourth y-axis 515 measure the output of the second sensor 216 of FIG. 2. In the illustrated example of FIG. 5, the third y-axis 514 and the fourth y-axis 515 extend between $V_{min}$ and $V_{max}$, which are the minimum voltage output by the second sensor 216 and the maximum voltage output by the second sensor 216, respectively. In some examples, the third y-axis 514 and/or the fourth y-axis 515 can have any suitable units of voltage (e.g., volts, etc.) and/or another suitable quantity representative of a sensor output.

In the illustrated example of FIG. 5, the first graph 502 includes an example line 524, which tracks the movement of the first portion 204 between the receiving of a command to translate at the first time 516 and the end of operation of the motor 212 at the fourth time 522. For example, at the first time 516, the steering wheel position controller circuitry 202 (e.g., via the user interface circuitry 402 of FIG. 4, etc.) can detect a command to move the moveable steering column assembly 200 from a fully stowed position to a fully deployed position and send a command to operate the motor 212 (e.g., via the system interface circuitry 404 of FIG. 4, etc.). In the illustrated example of FIG. 5, at the second time 518, the motor 212 begins to rotate at a steady state, which causes the first portion 204 and the steering wheel 104 to translate at a constant speed until the third time 520. In the illustrated example of FIG. 5, at the third time 520, the moveable steering column assembly 200 reaches the end of the travel, and the motor 212 stalls. At the fourth time 522, the steering wheel position controller circuitry 202 detects that the first portion 204 has reached the target position (e.g., the fully stowed position, etc.) and ceases operation of the motor 212 (e.g., powers off the motor 212, etc.).

In the illustrated example of FIG. 5, the second graph 504 includes an example first line 526 and an example second line 528, which tracks the current draw of the motor 212 of the first portion 204 between the receiving of a command to translate at the first time 516 and the end of operation of the motor 212 at the fourth time 522 at a first temperature and a second temperature, respectively. The first line 526 includes an example first inrush current segment 529, an example first steady-state segment 530, and an example first stall segment 532. The second line 528 includes an example second inrush current segment 534, an example second steady-state segment 536, and an example second stall segment 538.

In some examples, the first line 526 corresponds to the operation of the moveable steering column assembly 200 at normal operating temperatures (e.g., 70 degrees fahrenheit, etc.) and the second line 528 corresponds to the operation of the moveable steering column assembly 200 at cold operating temperatures (e.g., 0 degrees fahrenheit, etc.). In some examples, the reduction of viscosity of a lubricant used by the moveable steering column assembly 200 and/or thermal contraction at cold temperatures can change an amount of torque required to operate the motor 212 of the first actuator 302. That is, lower temperatures of the moveable steering column assembly 200 can increase an amount of current required to operate the motor 212. In the illustrated example of FIG. 5, the increased current requirement of the motor 212 at cold temperatures causes the second line 528 to be vertically displaced from the first line 526.

The inrush current segments 529, 534 are portions of the lines 524, 526 that correspond to a surge of current draw caused by the motor 212 being turned on. The inrush current segments 529, 534 are periods of increased current draw compared to the current draw associated with the steady-state segments 530, 536, respectively. In the illustrated example of FIG. 5, the inrush current segments 529, 534 of lines 524, 526 occur at $T_1$, when operation of the motor 212 begins, and end at $T_2$, when the current draw of the motor 212 has stabilized and reached a steady-state condition. In the illustrated example of FIG. 5, the inrush current segments 529, 534 are generally parabolic in shape. In other examples, the inrush current segments 529, 534 can have any other suitable shape depending on the configuration of the motor 212 (e.g., if the motor 212 is an AC motor, the inrush current segment would be sinusoidal, etc.).

The steady-state segments 530, 536 are portions of the lines 524, 526 that correspond to the current draw during the steady-state operation of the motor 212. In the illustrated example of FIG. 5, the steady-state segments 530, 536 of lines 524, 526 begin at $T_2$, following the inrush current segments 529, 534, respectively, and end at $T_3$, when the moveable steering column assembly 200 reaches the end of travel. In the illustrated example of FIG. 5, the current draw values of the steady-state segments 530, 536 can be used to generate an example first motor parameter range 539 and an example second motor parameter range 540. For example, the current draw of the motor 212 can be monitored by the manufacturer at a plurality of temperatures. In some such examples, a look-up table can be generated based on the current draw of the motor 212 at each of the plurality of temperatures. In some such examples, the look-up table can correlate the temperature of the moveable steering column assembly 200 and a range of expected current draws of the motor 212 at the temperature. Additionally or alternatively, the look-up table can be generated analytically based on a geometry of the moveable steering column assembly 200, the viscosity of the lubricant of the moveable steering column assembly 200, the thermal properties of the materials of the moveable steering column assembly 200, etc. It should be appreciated that the current draw of the motor 212 includes noise (not illustrated). Accordingly, the motor parameter ranges 539, 540 represent a band of current draws, including noise, that correspond to steady-state operation of the motor 212 at normal temperatures and cold temperatures, respectively.

The stall segments 532, 538 correspond to the current draw of the motor 212 while the motor 212 is stalling. In the illustrated example of FIG. 5, the stall segments 532, 538 of lines 524, 526 begin at $T_3$, when the moveable steering column assembly 200 reaches the end of travel and the steady-state segments 530, 536, respectively, end. In the illustrated example of FIG. 5, the stall segments 532, 538 segments of the lines 524, 526 end at $T_4$, when the motor 212 ceases to operate (e.g., powers off, etc.). The stall segments 532, 538 occur because the moveable steering column assembly 200 is nearing the end of travel (e.g., a pinion of the gear system 306 is near the end of a rack of the gear system 306, etc.), which inhibits the translation of the first portion 204 and rotation of the motor 212. However, in the illustrated example of FIG. 5, the motor 212 continues to apply an increased amount of torque to the first portion 204, which increases the current draw of the motor 212. The lines 524, 526 end at T4, at which the steering wheel position controller circuitry 202 detects the moveable steering column assembly 200 has reached the end of travel and ceases operation of the motor 212.

In the illustrated example of FIG. 5, the third graph 506 and the fourth graph 507 include an example first line 542 and an example second line 544, which track the output of the second sensor 216 during the translation of the first portion 204 between the receiving of a command to translate at the first time 516 and the end of operation of the motor 212 at the fourth time 522. In some examples, the first line 542 corresponds to the operation of the moveable steering column assembly 200 at normal operating temperatures (e.g., 70 degrees fahrenheit, etc.). In some such examples, the first line 542 corresponds to the output of the second sensor 216 during the current draw of the motor 212 represented by the first line 526 of the second graph 504. In the illustrated example, the second line 544 corresponds to the operation of the moveable steering column assembly 200 at cold operating temperatures (e.g., 0 degrees fahrenheit, etc.). In some examples, the reduction of viscosity of a lubricant used by the moveable steering column assembly 200 and/or thermal contraction at cold temperatures can slow the operation of the motor 212. In some such examples, the second line 544 corresponds to the output of the second sensor 216 during the current draw of the motor 212 represented by the second line 528 of the second graph 504. In the illustrated example of FIG. 5, the slower rotation of the motor 212 at cold temperatures causes the width and spacing of the pulses of the second line 544 to be longer than the width and spacing of the pulses of the first line 542.

In the illustrated example of FIG. 5, the lines 542, 544 are depicted as square waves. In some such examples, the lines 542, 544 have been filtered to produce square waves (e.g., via a high-pass filter, via a Schmitt trigger, via a comparator, etc.). In other examples, the first line 542 and/or the second line 544 can be depicted as sinusoidal wave(s). Each rotation of the motor 212 corresponds to a wave (e.g., a pulse) of the lines 542, 544. At the second time 518, the motor 212 begins to rotate and the lines 542, 544 begin to oscillate between $V_{max}$ and $V_{min}$. At the third time 520, the motor 212 begins to stall and slows in rotation, which increases the width of each oscillation of the lines 542, 544. Between the third time 520 and the fourth time 522, as the motor 212 continues to stall, the rotation of the motor slows 212, which causes the width and spacing of the lines 542, 544 to increase gradually until the fourth time 522. At the fourth time 522, the steering wheel position controller circuitry 202 detects the moveable steering column assembly 200 has reached the end of travel and ceases operation of the motor 212 and the line 542 ends.

It should be appreciated that the graphs 502, 504, 506, the axes 508, 510, 512, 514, 515 and the lines 524, 526, 528, 542, 544 are included for illustrative purposes only and are not to scale. For example, portions of the lines 524, 526, 528, 542, 544 may be longer, shorter, and/or exaggerated for demonstrative purposes. It should be appreciated that the durations between one or more of the times 516, 518, 520, 522 can vary based on the condition of the moveable steering column assembly 200. For example, the duration between the second time 518 and the third time 520 can be greater in colder temperatures (e.g., corresponding to the second line 528 of the second graph 504 and the second line 544 of the fourth graph 507, etc.) than in comparatively warmer temperatures (e.g., corresponding to the first line 526 of the second graph 504 and the first line 542 of the third graph 506, etc.) due to the slowed operation of the motor 212.

Figure 6:
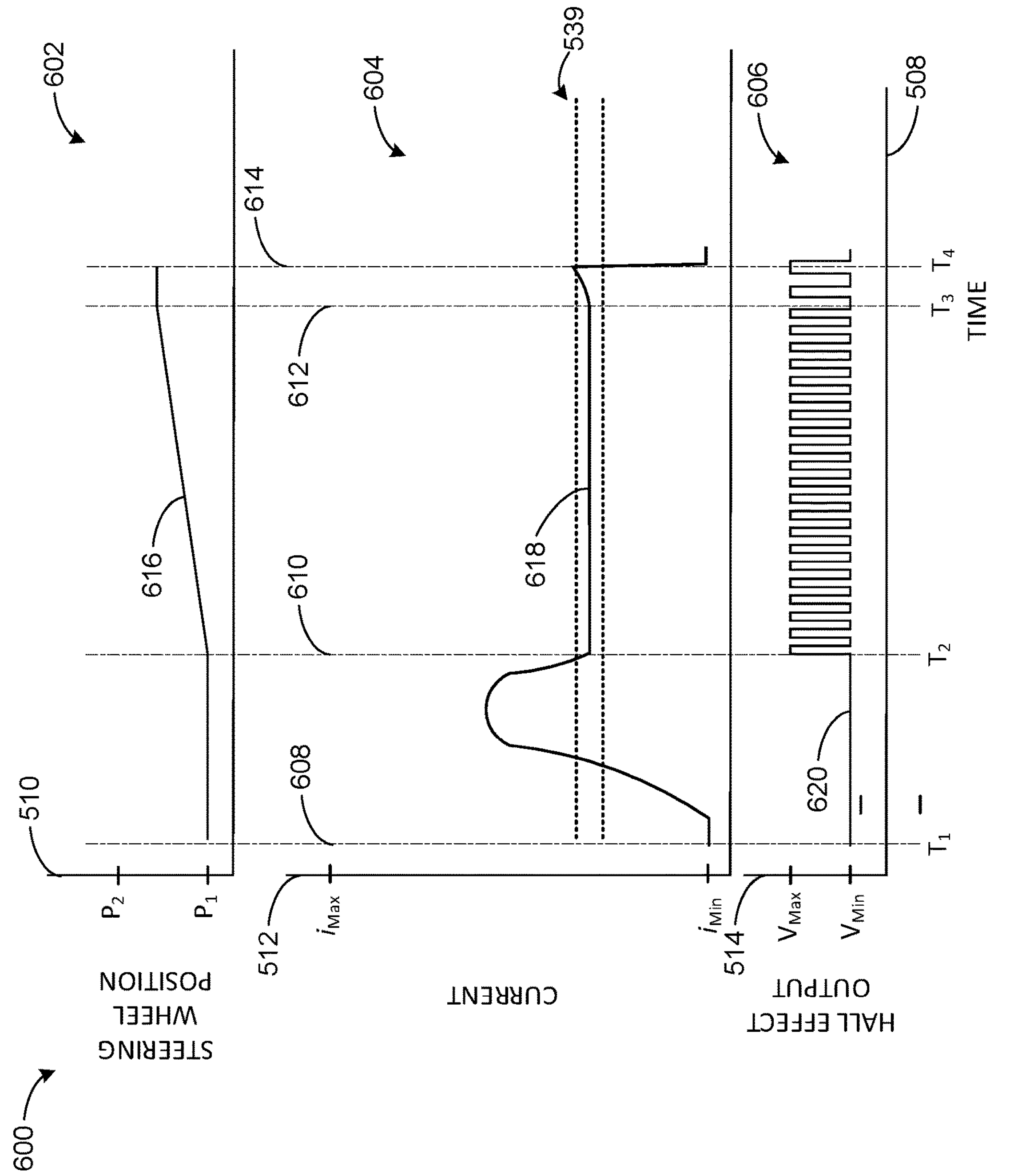
FIG. 6 is an example current, steering wheel position, and motor position graph during operation when an obstruction is encountered.

FIG. 6 is an example illustration of an example relationship 600 between parameters of the moveable steering column assembly 200 of FIGS. 2 and 3 during an operation when an obstruction is encountered. The example relationship 600 includes an example first graph 602, an example second graph 604, and an example third graph 606. The graphs 602, 604, 606 have the x-axis 508 of FIG. 5. In the illustrated example of FIG. 6, the first graph 602, the second graph 604, and the third graph 606 have the first y-axis 510 of FIG. 5, the second y-axis 512 of FIG. 5, and the third y-axis 514 of FIG. 5. In the illustrated example of FIG. 6, an example first time 608 ($T_1$), an example second time 610 ($T_2$), an example third time 612 ($T_3$), and an example fourth time 614 ($T_4$) are marked on the x-axis 508.

In the illustrated example of FIG. 6, the first graph 602 includes an example line 616, which tracks the movement of the first portion 204 between the receiving of a command to translate at the first time 608 and the powering off of the motor 212 at the fourth time 614. For example, at first time 608, the steering wheel position controller circuitry 202 (e.g., via the user interface circuitry 402 of FIG. 4, etc.) can detect a command to move the moveable steering column assembly 200 from a fully stowed position to a fully deployed position and send (e.g., via the system interface circuitry 404, etc.) a command to operate the motor 212. In the illustrated example of FIG. 6, at the second time 610, the motor 212 begins to rotate at a steady-state condition, which causes the first portion 204 and the steering wheel 104 to translate at a constant speed until the third time 612. At the third time 612, the moveable steering column assembly 200 encounters an obstruction (e.g., a person, cargo, etc.), which causes the motor 212 to begin to stall before the moveable steering column assembly 200 has reached the target position. At the fourth time 614, the steering wheel position controller circuitry 202 (e.g., the obstruction detector circuitry 412, etc.) detects the obstruction and powers off the motor 212, which causes the first portion 204 to stop moving.

In the illustrated example of FIG. 6, the second graph 604 includes an example line 618, which is similar to the first line 526 of FIG. 5 prior to the third time 612. In the illustrated example of FIG. 6, at the third time 612, the motor 212 begins to stall before the moveable steering column assembly 200 has reached the target position. As the motor 212 stalls, the current draw of the motor 212 increases. At the fourth time 614, the line 618 exceeds the upper boundary of the motor parameter range 539, which is detected by the steering wheel position controller circuitry 202 (e.g., via the obstruction detector circuitry 412, etc.) and identified as the moveable steering column assembly 200 encountering an obstruction.

In the illustrated example of FIG. 6, the third graph 606 includes an example line 620, which is similar to the line 542 of FIG. 5 prior to the third time 612. In the illustrated example of FIG. 6, at the third time 612, the motor 212 begins to stall before the moveable steering column assembly 200 has reached the target position. As the motor 212 stalls, the rotation of the motor 212 slows, which widens the width of the oscillations of the line 620. Between the third time 612 and the fourth time 614, as the resistance of encountered obstruction causes the rotation of the motor 212 to slow and/or stall, which causes the width and spacing of the line 620 to increase gradually until the fourth time 614. At the fourth time 614, the steering wheel position controller circuitry 202 (e.g., the obstruction detector circuitry 412, etc.) detects the obstruction and powers off the motor 212, which causes the first portion 204 to stop moving.

In the illustrated example of FIG. 6, the steering wheel position controller circuitry 202 detects the obstruction encountered at the third time 612 via the current draw of the motor 212 exceeds the first motor parameter range 539 when not experiencing an inrush current (e.g., the behavior of the line 618 between the first time 608 and the line 620, etc.) or near an end of travel of the moveable steering column assembly 200. In other examples, other motor parameters that are proportional to the current draw can be used instead of the current draw by the steering wheel position controller circuitry 202 (e.g., the torque of the motor 212, the power of the motor 212, etc.). Additionally or alternatively, the steering wheel position controller circuitry 202 can detect the obstruction in other manners. For example, the steering wheel position controller circuitry 202 can detect, via the first sensor 214, that the translation of the first portion 204 slowed and/or stopped at the third time 612. For example, the steering wheel position controller circuitry 202 can detect the width of the oscillations of the line 620 increased at the third time 612.

It should be appreciated that the graphs 602, 604, 606, the axes 508, 510, 512, 514, and the lines 616, 618, 620 are included for illustrative purposes only and are not to scale. For example, portions of the lines 616, 618, 620 may be longer, shorter, and/or exaggerated for demonstrative purposes.

Figure 7:
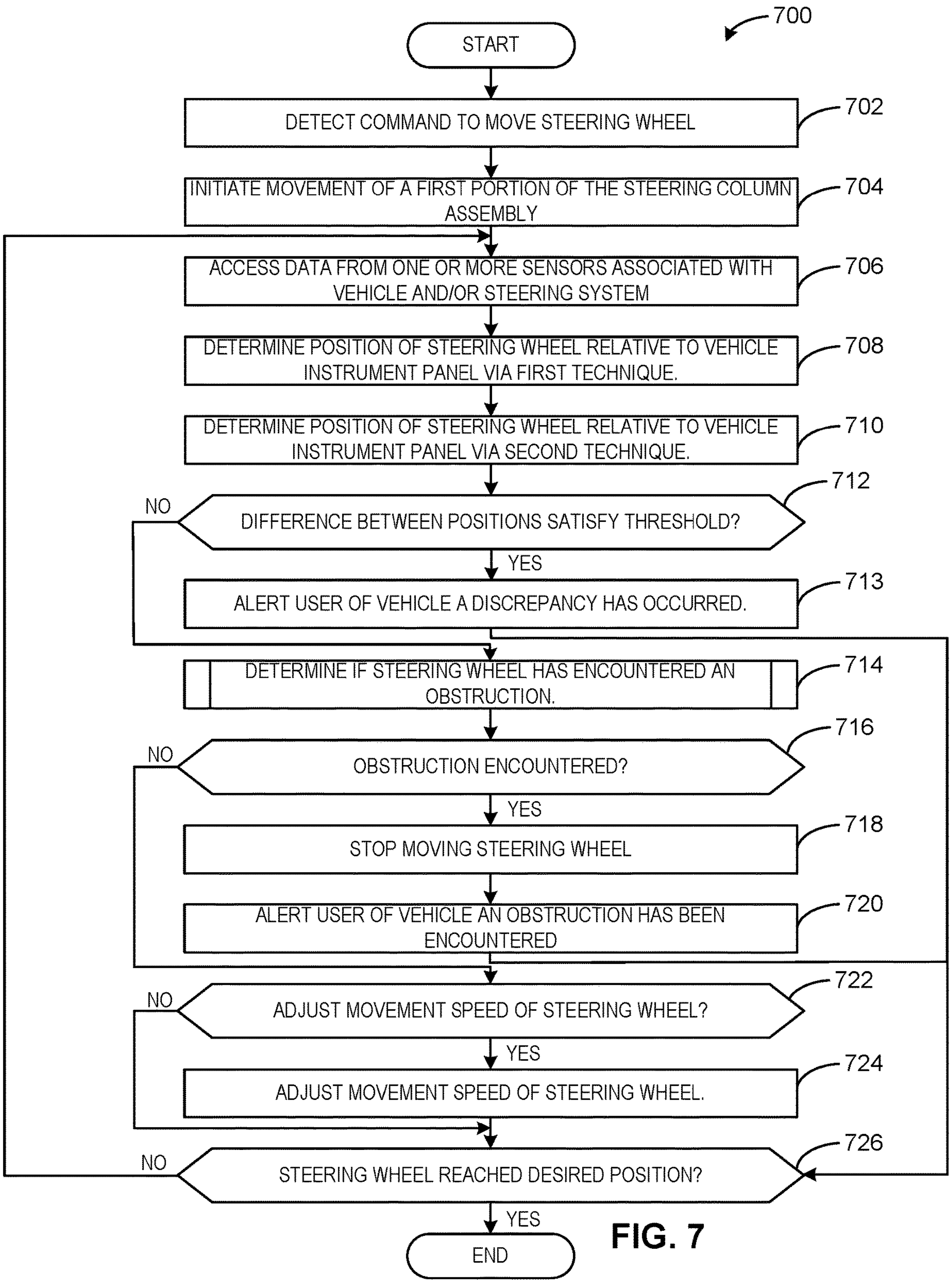
FIGS. 7 and 8 depict flowcharts representative of example machine readable instructions and/or example operations that may be executed, instantiated, and/or performed by example programmable circuitry to implement the steering wheel position controller circuitry of FIG. 4.
Figure 8:
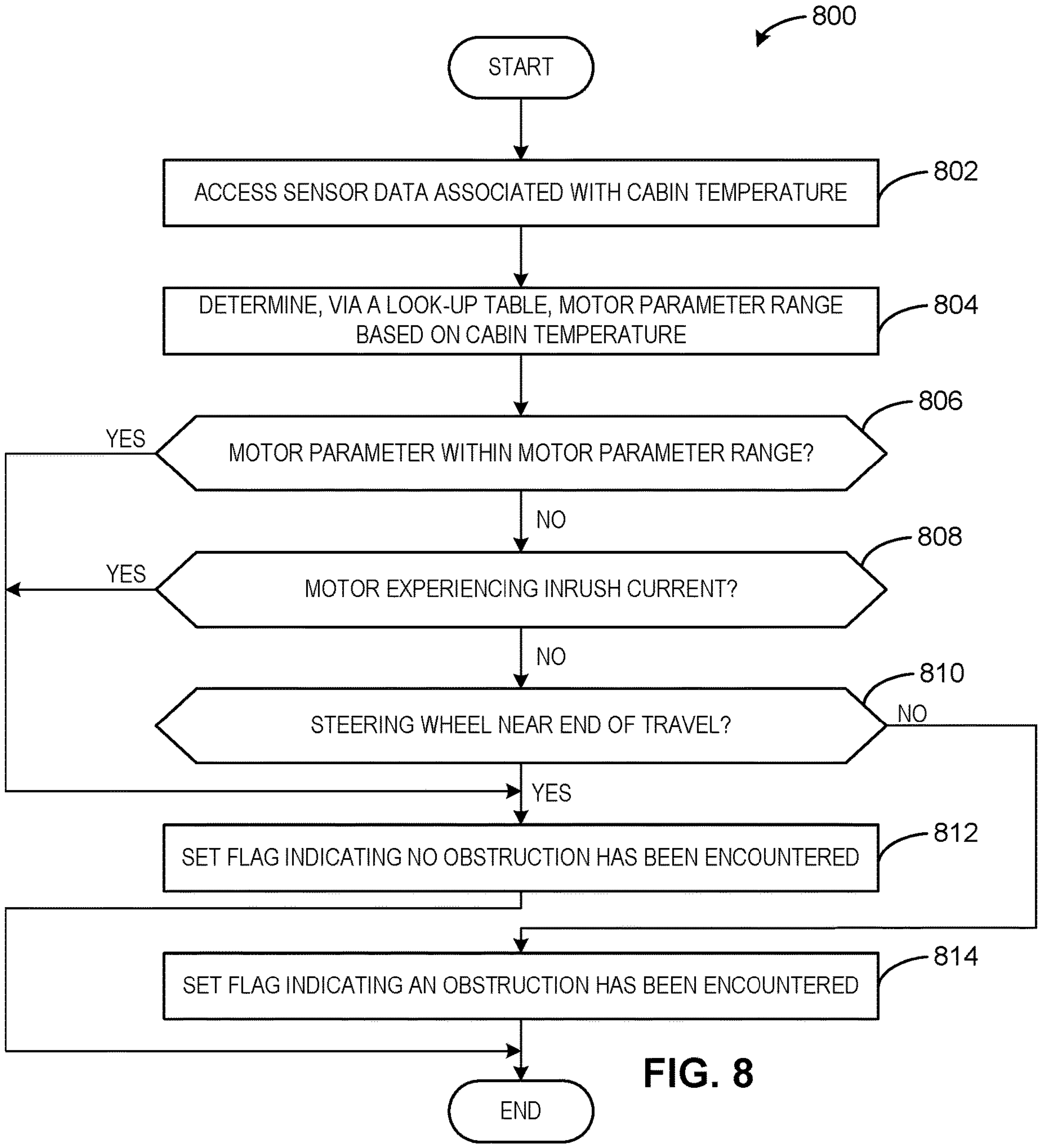

Flowcharts representative of example machine readable instructions, which may be executed by programmable circuitry to implement and/or instantiate the steering wheel position controller circuitry 202 of FIG. 4 and/or representative of example operations which may be performed by programmable circuitry to implement and/or instantiate the steering wheel position controller circuitry 202 of FIG. 4, are shown in FIGS. 7 and 8. The machine readable instructions may be one or more executable programs or portion(s) of one or more executable programs for execution by programmable circuitry such as the programmable circuitry 912 shown in the example programmable circuitry platform 900 discussed below in connection with FIG. 9 and/or may be one or more function(s) or portion(s) of functions to be performed by the example programmable circuitry (e.g., an FPGA) discussed below in connection with FIGS. 10 and/or 11. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 7 and 8, many other methods of implementing the example steering wheel position controller circuitry 202 may alternatively be used. For example, the order of execution of the blocks of the flowcharts may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7 and 8 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed, instantiated, and/or performed by programmable circuitry to operate the moveable steering column assembly 200 of FIGS. 2 and 3. The example machine-readable instructions and/or the example operations 700 of FIG. 3 begin at block 702, at which the user interface circuitry 402 accesses inputs from an interface of the vehicle 100. For example, the user interface circuitry 402 can access a request to move the longitudinal position of the steering wheel 104 within the passenger cabin 108 of the vehicle 100 (e.g., a request to stow the steering wheel 104, a request to unstow a steering wheel 104, etc.). In some examples, the user interface circuitry 402 can detect an input via the steering wheel 104 (e.g., via a button disposed thereon, etc.) and/or an interface of the instrument panel 106 (e.g., via a button on the instrument panel 106, via touch screen of the instrument panel 106, etc.). In some examples, the user interface circuitry 402 can generate a request to move the longitudinal position in response to another user input (e.g., an ignition of the vehicle 100, an adjustment of a driver seat of the vehicle 100, etc.). In some examples, the user interface circuitry 402 can detect a request to move the longitudinal position of the steering wheel 104 from an autonomous driving system of the vehicle 100, etc.

At block 704, the system interface circuitry 404 initiates movement of the steering wheel 104 based on the accessed command. For example, the system interface circuitry 404 can cause the operation of the first actuator 302 of FIG. 3 and the motor 212 of FIGS. 2 and 3 to cause the longitudinal translation of the first portion 204 of the moveable steering column assembly 200 relative to the second portion 206 of the moveable steering column assembly 200. In some such examples, the system interface circuitry 404 can send a command to the first actuator 302 (e.g., an electrical signal, etc.) to begin rotating the motor 212 in a direction corresponding to the accessed command (e.g., a first direction to move the steering wheel 104 towards the instrument panel 106, a second direction to move the steering wheel away from the instrument panel 106, etc.).

At block 706, the sensor interface circuitry 406 accesses sensor data from one or more sensors associated with the vehicle 100. For example, the sensor interface circuitry 406 can receive sensor data from the temperature sensor 110 of FIG. 1, the first sensor 214 of FIG. 2, and/or the second sensor 216. In some examples, the sensor interface circuitry 406 can access sensor data from other sensors of the vehicle 100 (e.g., another temperature sensor of the vehicle 100 etc.). In some examples, the sensor interface circuitry 406 can convert the data received from the sensors 110, 214, 216 into a numerical form (e.g., human-readable, etc.).

At block 708, the position determiner circuitry 408 determines a first estimated position of the steering wheel 104 relative to the instrument panel 106 of the vehicle 100 using a first method. For example, the position determiner circuitry 408 can use sensor information from the first sensor 214 to determine the position of the first portion 204 relative to the second portion 206. In some such examples, if the first sensor 214 is a mechanical sensor associated with the first portion 204, the second portion 206, and/or the gear system 306 enabling the relative thereof, the position determiner circuitry 408 can determine the position of the steering wheel 104 (e.g., the first portion 204, etc.) by correlating the output of the first sensor 214 with a position of the steering wheel 104 and/or the first portion 204 (e.g., a first sensor value can be correlated with the first position, a second sensor value can be correlated with the second position, etc.). In some such examples, if the first sensor 214 is a mechanical sensor associated with the first portion 204, the second portion 206, and/or the gear system 306 enabling the relative thereof, the position determiner circuitry 408 can determine the position of the steering wheel 104 and/or the first portion 204 without the starting position of the first portion 204 (e.g., a power outage occurs, etc.). In some such examples, depending on the type of sensor implementing the first sensor 214, the first method used by the position determiner circuitry 408 can have a lower resolution than other methods (e.g., the second method of block 710, etc.) than can be used to determine the position of the first portion 204 and/or the steering wheel 104.

At block 710, the position determiner circuitry 408 determines a second estimated position of the steering wheel 104 relative to the instrument panel 106 of the vehicle 100 using a second method. For example, the position determiner circuitry 408 can use sensor information from the second sensor 216 to determine the position of the first portion 204 relative to the second portion 206. For example, the position determiner circuitry 408 can determine a position using sensor information from the second sensor 216 (e.g., a Hall effect sensor coupled to the motor 212, etc.). In some such examples, the position determiner circuitry 408 can determine the position of the first portion 204 based on a starting position of the first portion 204 and a quantity of rotations of the motor 212. For example, the position determiner circuitry 408 can determine a displacement of the first portion 204 based on the number of rotations of the motor 212 and the relationship between rotation of the motor 212 and the translation of the first portion 204 (e.g., based on the properties of the first actuator 302 and/or the gear system 306, etc.). In some such examples, depending on the type of sensor implementing the second sensor 216, the second method used by the position determiner circuitry 408 can have a greater resolution than other methods (e.g., the first method of block 708, etc.) than can be used to determine the position of the first portion 204 and/or the steering wheel 104. In some such examples, the position determiner circuitry 408 does not use the second method if the starting position of the steering wheel 104 and/or the first portion 204 is unknown (e.g., a power outage occurred in the vehicle 100, etc.).

At block 712, the position comparator circuitry 410 determines if the difference between the estimated position satisfies a threshold. For example, the position comparator circuitry 410 can compare the first estimated position and the second estimated position to determine an absolute difference between the estimated positions and/or a relative difference between the estimated position values. In some examples, the threshold can be based on a user preference, a manufacturer setting, and/or a geometric property of the vehicle 100. In some examples, threshold can be an absolute value (e.g., 10 millimeters, 1 centimeter, etc.). In other examples, the threshold can be a percentage (e.g., a maximum percentage difference between the first estimated position and the second estimated position, etc.). If the position comparator circuitry 410 determines the difference between the first estimated position value and second estimated position satisfies the threshold, the operations 700 advance to block 714. If the position comparator circuitry 410 determines the difference between the first estimated position value and second estimated position does not satisfy the threshold, the operations 700 advance to block 713.

At block 713, the user interface circuitry 402 generates an alert indicating a discrepancy has occurred in the moveable steering column assembly 200. For example, the user interface circuitry 402 can generate an alert based on a command from the position comparator circuitry 410. In some examples, the user interface circuitry 402 can generate a visual alert (e.g., via a dashboard indicator/warning light, an indicator on the steering wheel 104, a screen of the vehicle 100, a screen of a user device of a user of the vehicle 100, etc.), an audio alert (e.g., via a speaker of the vehicle 100, via a speaker of a user device of a user of the vehicle 100, etc.) and/or tactile feedback (e.g., tactile feedback via a seat of the vehicle 100, tactile feedback via the steering wheel 104, etc.). In some examples, the user interface circuitry 402 can generate an alert indicating the vehicle 100 is to be serviced to address the detected discrepancy (e.g., recalibration of the sensors 214, 216, etc.).

At block 714, the obstruction detector circuitry 412 determines if the steering wheel 104 and/or the first portion 204 has encountered an obstruction. For example, the obstruction detector circuitry 412 can determine if the steering wheel 104 and/or another part of the moveable steering column assembly 200 has contacted an objection (e.g., a person, cargo in the passenger cabin 108, etc.) during translation. Example operations that can be used to execute block 714 are described below in conjunction with FIG. 8.

At block 716, the system interface circuitry 404 determines if an obstruction was detected during the execution of block 714. For example, the system interface circuitry 404 can determine if the obstruction detector circuitry 412 determined the steering wheel 104 and/or the first portion 204 during the execution of block 714 and/or the operations 800 of FIG. 8. In some examples, the system interface circuitry 404 can access a memory of the vehicle 100 to determine if the obstruction detector circuitry 412 has set a flag indicating the steering wheel 104 and/or the first portion 204 has encountered an obstruction and/or has set a flag indicating the steering wheel 104 and/or the first portion 204 has not encountered an obstruction. If the system interface circuitry 404 determines an obstruction has been detected, the operations 700 advance to block 718. If the system interface circuitry 404 determines an obstruction has not been detected, the operations 700 advance to block 722.

At block 718, the system interface circuitry 404 stops moving the steering wheel 104. For example, the system interface circuitry 404 can send an instruction to the first actuator 302 to cease operations. In some examples, the system interface circuitry 404 can cause the steering wheel 104 to recoil (e.g., briefly move in an opposite direction of the previous translation, etc.) by sending an instruction to the first actuator 302 to cause the first portion 204 to translation in an opposite direction.

At block 720, the user interface circuitry 402 generates an alert indicating an obstruction has been encountered by the moveable steering column assembly 200. For example, the user interface circuitry 402 can generate an alert in response to a command from an obstruction detector circuitry 412. In some examples, the user interface circuitry 402 can generate a visual alert (e.g., via a dashboard indicator/warning light, an indicator on the steering wheel 104, a screen of the vehicle 100, a screen of a user device of a user of the vehicle 100, etc.), an audio alert (e.g., via a speaker of the vehicle 100, via a speaker of a user device of a user of the vehicle 100, etc.) and/or tactile feedback (e.g., tactile feedback via a seat of the vehicle 100, tactile feedback via the steering wheel 104, etc.). In some examples, the user interface circuitry 402 can generate an alert indicating that the obstruction should be removed from the path of the moveable steering column assembly 200.

At block 722, the speed adjuster circuitry 414 determines if the speed of translation of the first portion 204 is to be adjusted. For example, the speed adjuster circuitry 414 can determine if the speed of translation of the first portion 204 is to be adjusted based on a current position of the steering wheel 104, a user preference, and/or a manufacturer setting. If the speed adjuster circuitry 414 determines the speed of translation is to be adjusted, the operations 700 advance to block 724. If the speed adjuster circuitry 414 determines the speed of translation is not to be adjusted, the operations 700 advance to block 726.

At block 724, the speed adjuster circuitry 414 adjusts the speed of translation of the steering wheel 104. For example, the speed adjuster circuitry 414 can adjust the speed of translation via pulse width modulation (PWM). In some examples, the speed adjuster circuitry 414 can adjust the speed of translation to a speed between a lower speed (e.g., approximately 11 millimeters per second, etc.) and an upper speed (e.g., approximately 44 millimeters per second, etc.). In some examples, the speed adjuster circuitry 414 can increase the speed of translation when the steering wheel 104 is not near the target position and/or decrease the speed of translation when the steering wheel 104 is near the target position. In some examples, the speed adjuster circuitry 414 can adjust the speed of translation to reduce loudness and/or sound fluctuations of the moveable steering column assembly 200 (e.g., prevent large changes in torque applied to the gear system 306 of the moveable steering column assembly 200, etc.).

At block 726, the position determiner circuitry 408 determines if the target position has been reached by the steering wheel 104. For example, the position determiner circuitry 408 can determined if the target position has been reached via the estimated positions determined during the execution of block 708 and/or block 710. In some examples, the position determiner circuitry 408 can determine if the target position has been meant via sensor information for the first sensor 214 and/or the second sensor 216. If the position determiner circuitry 408 determines the target position has been reached, the operations 700 end. If the position determiner circuitry 408 determines the target position has not been reached, the operations 700 return to block 706.

FIG. 8 is a flowchart representative of example machine readable instructions and/or example operations 800 that may be executed, instantiated, and/or performed by programmable circuitry to determine if the steering column assembly 200 has encountered an obstruction (e.g., the execution of block 714 of FIG. 7, etc.). The example machine-readable instructions and/or the example operations 800 of FIG. 3 begin at block 802, at which the sensor interface circuitry 406 accesses sensor data associated with the temperature of the moveable steering column assembly 200. For example, the sensor interface circuitry 406 can receive sensor data from the temperature sensor 110 of FIG. 1. In some examples, the sensor interface circuitry 406 can access sensor data from other temperature sensors of the vehicle 100 (e.g., an external temperature sensor of the vehicle 100 etc.). In some examples, the sensor interface circuitry 406 can convert the data received from the sensors 110 into a numerical form (e.g., human-readable, etc.).

At block 804, the obstruction detector circuitry 412 determine motor parameter range based on the temperature. For example, the obstruction detector circuitry 412 can determine a range of draw currents for the motor 212 (e.g., the first motor parameter range 539 of FIG. 5, the second motor parameter range 540 of FIG. 5, etc.). Additionally or alternatively, the obstruction detector circuitry 412 can determine a range for a motor parameter that is proportional to the drawn current of the motor 212 (e.g., output motor force, motor power, motor torque, etc.). In some examples, the obstruction detector circuitry 412 can determine a range of motor parameters corresponding to unobstructed movement of the first portion 204 (e.g., normal, non-stalled operation of the motor 212, etc.). In some examples, the obstruction detector circuitry 412 can determine the motor parameter range based on a look-up table stored in a memory associated with the vehicle 100. In some such examples, the look-up table used by the obstruction detector circuitry 412 can be generated experimentally and/or analytically. In other examples, the obstruction detector circuitry 412 can determine the range analytically (e.g., via an expected thermal expansion of components, via an expected viscosity change of a lubricant of the moveable steering column assembly 200, etc.).

At block 806, the obstruction detector circuitry 412 determines if the motor parameter is within the motor parameter range. For example, the obstruction detector circuitry 412 can determine if the motor parameter (e.g., the current draw of the motor 212, etc.) is within the range determined by the obstruction detector circuitry 412 during the execution of block 804. If the obstruction detector circuitry 412 determines the motor parameter is within the motor parameter range, the operations 800 advance to block 812. If the obstruction detector circuitry 412 determines the motor parameter is not within the motor parameter range (e.g., outside of the range, etc.), the operations 800 advance to block 808.

At block 808, the obstruction detector circuitry 412 determines if the motor 212 is experiencing an inrush current (e.g., the inrush current segments 529, 534 of FIG. 5, etc.). For example, the obstruction detector circuitry 412 can determine if the operation motor 212 has been recently initiated by comparing the time since the system interface circuitry 404 sent a command to the motor 212 (e.g., the execution of block 704, etc.) and a threshold time (e.g., 10 milliseconds, 50 milliseconds, 500 milliseconds, 1 second, etc.). Additionally or alternatively, the obstruction detector circuitry 412 can determine if the motor 212 is experiencing an inrush current in any other suitable manner (e.g., using previously received sensor data to determine if an inrush current has previously occurred during the current operation of the motor 212, etc.). If the obstruction detector circuitry 412 determines an inrush current is occurring, the operations 800 advance to block 812. If the obstruction detector circuitry 412 determines an inrush current is not currently occurring, the operations 800 advance to block 810.

At block 810, the obstruction detector circuitry 412 determines if the moveable steering column assembly 200 is near the end of travel. For example, the obstruction detector circuitry 412 can determine if the moveable steering column assembly 200 is near a fully stowed position and/or a fully deployed position. In some such examples, the obstruction detector circuitry 412 can use the data from the first sensor 214 to determine the absolute position of the first portion 204. In some examples, an elevated draw current is associated with a stall (e.g., the stall segment 532 of FIG. 5, the stall segment 538 of FIG. 5, etc.) caused by the motor 212 operating against a mechanical limit of the moveable steering column assembly 200 (e.g., an end of a rack associated with the gear system 306 of FIG. 3, etc.). If the obstruction detector circuitry 412 determines the moveable steering column assembly 200 is near the end of travel, the operations 800 advance to block 812. If the obstruction detector circuitry 412 determines moveable steering column assembly 200 is near the end of travel, the operations 800 advance to block 814.

At block 812, the obstruction detector circuitry 412 sets a flag indicating that no obstruction has been encountered by the moveable steering column assembly 200. For example, the obstruction detector circuitry 412 can make an indication in a memory associated with the vehicle 100 that no obstructions have been encountered by the moveable steering column assembly 200. At block 814, the obstruction detector circuitry 412 sets a flag indicating that an obstruction has been encountered by the moveable steering column assembly 200. For example, the obstruction detector circuitry 412 can make an indication in a memory associated with the vehicle 100 that an obstruction has been encountered by the moveable steering column assembly 200. After the execution of block 812 or block 814, the operations 800 end and the operations 700 return to block 716.

Figure 9:
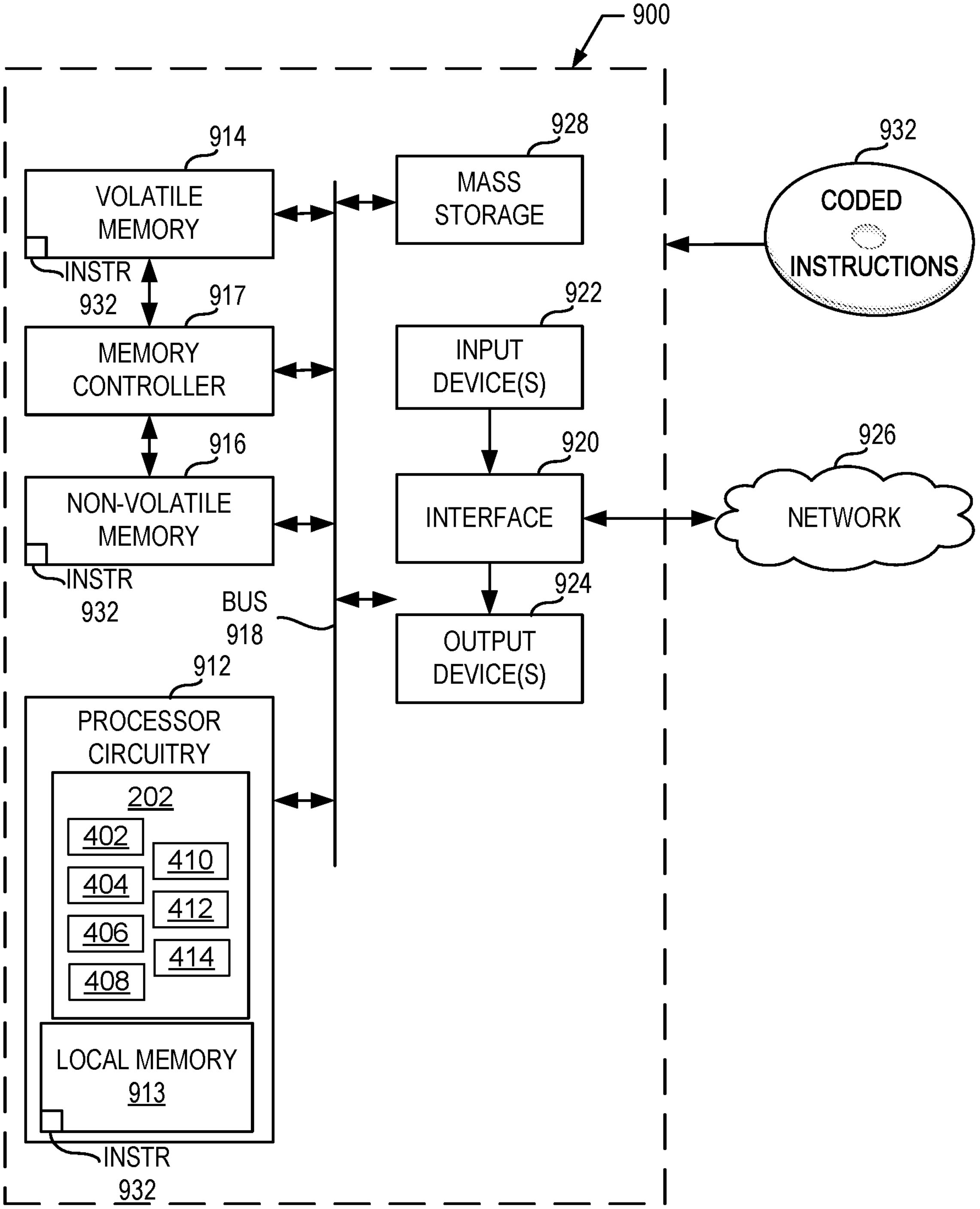
FIG. 9 is a block diagram of an example processing platform including programmable circuitry structured to execute, instantiate, and/or perform the example machine readable instructions and/or perform the example operations of FIGS. 7 and 8 to implement the steering wheel position controller circuitry of FIG. 4.

FIG. 9 is a block diagram of an example programmable circuitry platform 900 structured to execute and/or instantiate the example machine-readable instructions and/or the example operations of FIGS. 7 and 8 to implement the steering wheel position controller circuitry 202 of FIG. 4. The programmable circuitry platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a headset (e.g., an augmented reality (AR) headset, a virtual reality (VR) headset, etc.) or other wearable device, or any other type of computing and/or electronic device.

The programmable circuitry platform 900 of the illustrated example includes programmable circuitry 912. The programmable circuitry 912 of the illustrated example is hardware. For example, the programmable circuitry 912 can be implemented by one or more integrated circuits, logic circuits, FPGAs, microprocessors, CPUs, GPUs, DSPs, and/or microcontrollers from any desired family or manufacturer. The programmable circuitry 912 may be implemented by one or more semiconductor based (e.g., silicon based) devices. In this example, the programmable circuitry 912 implements the user interface circuitry 402, the system interface circuitry 404, the sensor interface circuitry 406, the position determiner circuitry 408, the position comparator circuitry 410, the obstruction detector circuitry 412, and the speed adjuster circuitry 414.

The programmable circuitry 912 of the illustrated example includes a local memory 913 (e.g., a cache, registers, etc.). The programmable circuitry 912 of the illustrated example is in communication with main memory 914, 916, which includes a volatile memory 914 and a non-volatile memory 916, by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917. In some examples, the memory controller 917 may be implemented by one or more integrated circuits, logic circuits, microcontrollers from any desired family or manufacturer, or any other type of circuitry to manage the flow of data going to and from the main memory 914, 916.

The programmable circuitry platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user (e.g., a human user, a machine user, etc.) to enter data and/or commands into the programmable circuitry 912. The input device(s) 922 can be implemented by, for example, an audio sensor, a microphone, a camera (still or video), a keyboard, a button, a mouse, a touchscreen, a trackpad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 900 of the illustrated example also includes one or more mass storage discs or devices 928 to store firmware, software, and/or data. Examples of such mass storage discs or devices 928 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 932, which may be implemented by the machine readable instructions of FIGS. 7 and 8, may be stored in the mass storage device 928, in the volatile memory 914, in the non-volatile memory 916, and/or on at least one non-transitory computer readable storage medium such as a CD or DVD which may be removable.

Figure 10:
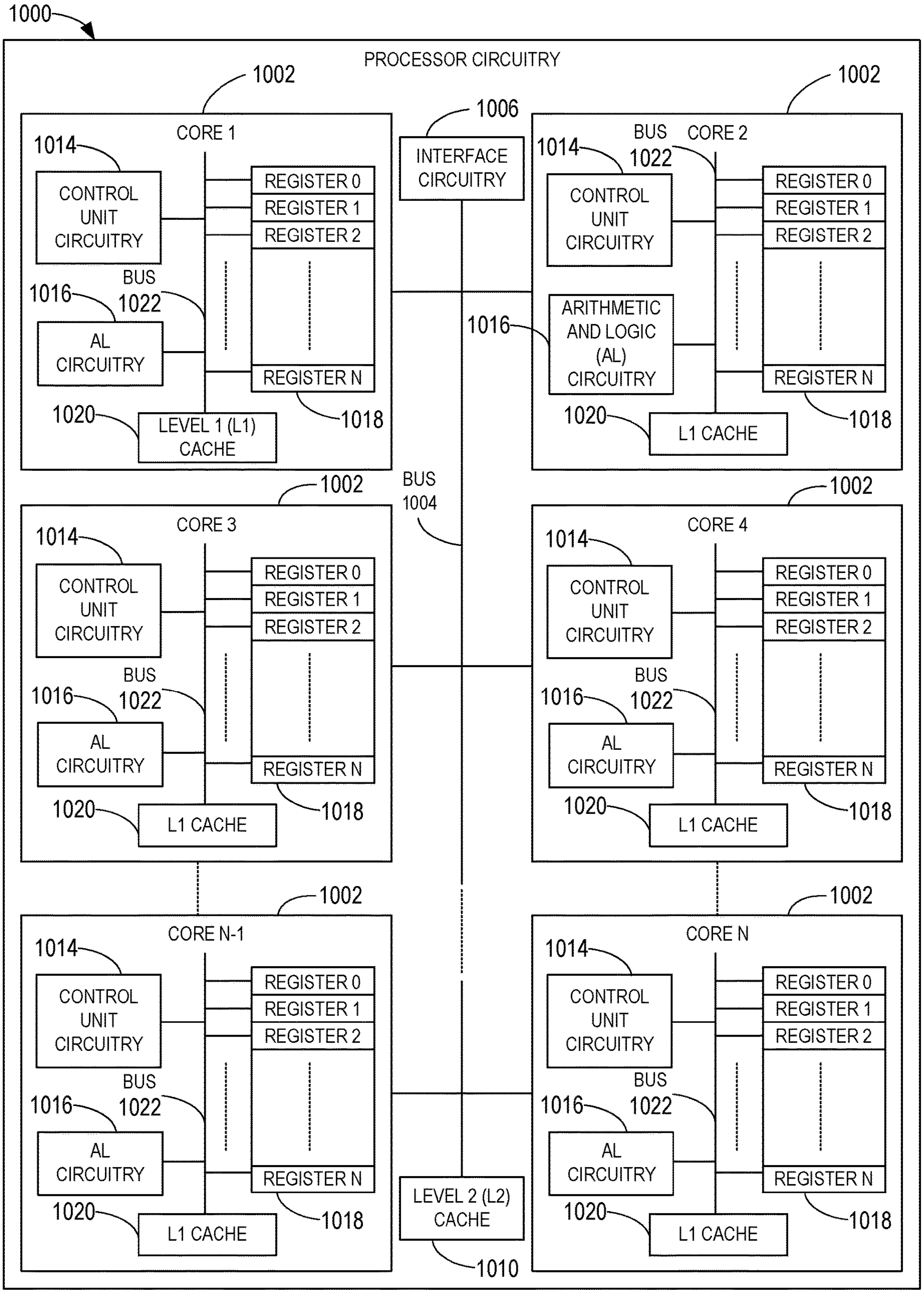
FIG. 10 is a block diagram of an example implementation of the programmable circuitry of FIG. 9.

FIG. 10 is a block diagram of an example implementation of the programmable circuitry 912 of FIG. 9. In this example, the programmable circuitry 912 of FIG. 9 is implemented by a microprocessor 1000. For example, the microprocessor 1000 may be a general-purpose microprocessor (e.g., general-purpose microprocessor circuitry). The microprocessor 1000 executes some or all of the machine-readable instructions of the flowcharts of FIGS. 7 and 8 to effectively instantiate the circuitry of FIG. 2 as logic circuits to perform operations corresponding to those machine readable instructions. In some such examples, the circuitry of FIG. 4 is instantiated by the hardware circuits of the microprocessor 1000 in combination with the machine-readable instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 7 and 8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating-point operations. In yet other examples, the AL circuitry 1016 may include first AL circuitry that performs integer-based operations and second AL circuitry that performs floating-point operations. In some examples, the AL circuitry 1016 may be referred to as an Arithmetic Logic Unit (ALU).

The registers 1018 are semiconductor-based structures to store data and/or instructions such as results of one or more of the operations performed by the AL circuitry 1016 of the corresponding core 1002. For example, the registers 1018 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure, such as by being distributed throughout the core 1002 to shorten access time. The second bus 1022 may be implemented by at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages.

The microprocessor 1000 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1000, in the same chip package as the microprocessor 1000 and/or in one or more separate packages from the microprocessor 1000.

Figure 11:
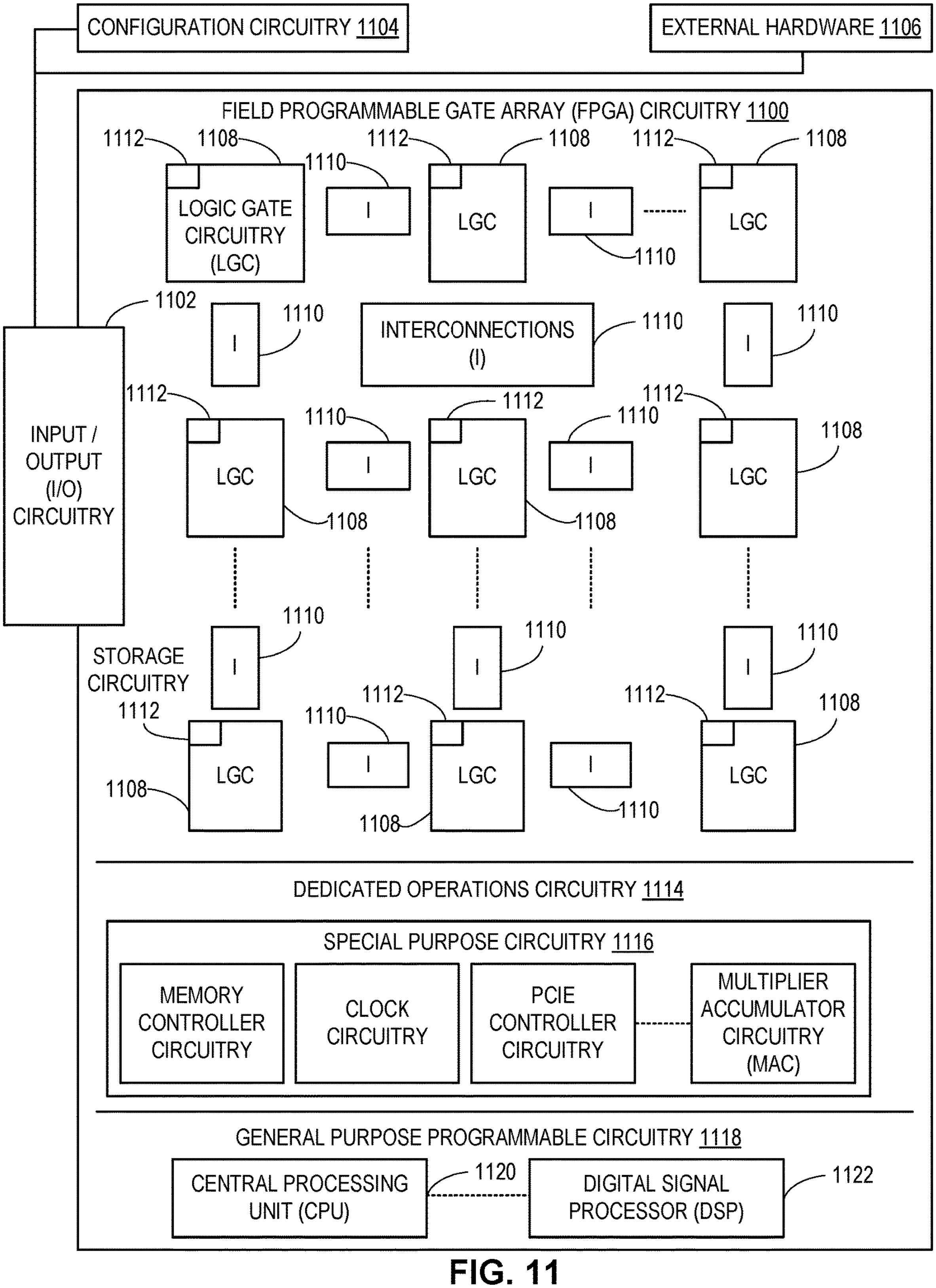
FIG. 11 is a block diagram of another example implementation of the programmable circuitry of FIG. 9.

FIG. 11 is a block diagram of another example implementation of the programmable circuitry 912 of FIG. 9. In this example, the programmable circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 7 and 8 but whose interconnections and logic circuitry are fixed once fabricated), the FPGA circuitry 1100 of the example of FIG. 11 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 7 and 8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 7 and 8. As such, the FPGA circuitry 1100 may be configured and/or structured to effectively instantiate some or all of the operations/functions corresponding to the machine readable instructions of the flowcharts of FIGS. 7 and 8 as dedicated logic circuits to perform the operations/functions corresponding to those software instructions in a dedicated manner analogous to an ASIC. Therefore, the FPGA circuitry 1100 may perform the operations/functions corresponding to the some or all of the machine readable instructions of FIGS. 7 and 8 faster than the general-purpose microprocessor can execute the same.

In the example of FIG. 11, the FPGA circuitry 1100 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1100 of FIG. 11 may access and/or load the binary file to cause the FPGA circuitry 1100 of FIG. 11 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1100 of FIG. 11 to cause configuration and/or structuring of the FPGA circuitry 1100 of FIG. 11, or portion(s) thereof.

The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain a binary file, which may be implemented by a bit stream, data, and/or machine-readable instructions, to configure the FPGA circuitry 1100, or portion(s) thereof. In some such examples, the configuration circuitry 1104 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1106 may be implemented by external hardware circuitry. For example, the external hardware 1106 may be implemented by the microprocessor 1000 of FIG. 10.

The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations/functions that may correspond to at least some of the machine readable instructions of FIGS. 7 and 8 and/or other desired operations. The logic gate circuitry 1108 shown in FIG. 11 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations/functions. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example dedicated operations circuitry 1114. In this example, the dedicated operations circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the programmable circuitry 912 of FIG. 9, many other approaches are contemplated. For example, FPGA circuitry may include an on-board CPU, such as one or more of the example CPU 1120 of FIG. 10. Therefore, the programmable circuitry 912 of FIG. 9 may additionally be implemented by combining at least the example microprocessor 1000 of FIG. 10 and the example FPGA circuitry 1100 of FIG. 11. In some such hybrid examples, one or more cores 1002 of FIG. 10 may execute a first portion of the machine readable instructions represented by the flowcharts of FIGS. 7 and 8 to perform first operation(s)/function(s), the FPGA circuitry 1100 of FIG. 11 may be configured and/or structured to perform second operation(s)/function(s) corresponding to a second portion of the machine readable instructions represented by the flowcharts of FIGS. 7 and 8, and/or an ASIC may be configured and/or structured to perform third operation(s)/function(s) corresponding to a third portion of the machine readable instructions represented by the flowcharts of FIGS. 7 and 8.

It should be understood that some or all of the circuitry of FIG. 4 may, thus, be instantiated at the same or different times. For example, same and/or different portion(s) of the microprocessor 1000 of FIG. 10 may be programmed to execute portion(s) of machine-readable instructions at the same and/or different times. In some examples, same and/or different portion(s) of the FPGA circuitry 1100 of FIG. 11 may be configured and/or structured to perform operations/functions corresponding to portion(s) of machine-readable instructions at the same and/or different times.

In some examples, some or all of the circuitry of FIG. 4 may be instantiated, for example, in one or more threads executing concurrently and/or in series. For example, the microprocessor 1000 of FIG. 10 may execute machine readable instructions in one or more threads executing concurrently and/or in series. In some examples, the FPGA circuitry 1100 of FIG. 11 may be configured and/or structured to carry out operations/functions concurrently and/or in series. Moreover, in some examples, some or all of the circuitry of FIG. 4 may be implemented within one or more virtual machines and/or containers executing on the microprocessor 1000 of FIG. 10.

In some examples, the programmable circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the programmable circuitry 912 of FIG. 9, which may be in one or more packages. For example, the XPU may include a CPU (e.g., the microprocessor 1000 of FIG. 10, the CPU 1120 of FIG. 11, etc.) in one package, a DSP (e.g., the DSP 1122 of FIG. 11) in another package, a GPU in yet another package, and an FPGA (e.g., the FPGA circuitry 1100 of FIG. 11) in still yet another package. [0137] methods and apparatus to control stowable steering wheels are disclosed herein. Further examples and combinations thereof include the following:

Example 1 includes an apparatus comprising a steering column assembly including a sensor, a first portion, and a second portion moveable relative to the first portion, machine readable instructions, and programmable circuitry to at least one of instantiate or execute the machine readable instructions to move the first portion relative to the second portion, determine based on an output of the sensor that the first portion has encountered an obstruction, and after determining the first portion has encountered the obstruction, stop a movement the first portion.

Example 2 includes the apparatus of example 1, wherein the sensor is a first sensor, the output is a first sensor output, and the programmable circuitry is to at least one of instantiate or execute the machine readable instructions to determine, based on the first sensor output, a first estimated position of the first portion, determine, based on a second sensor output of a second sensor, a second estimated position of the first portion, and determine if a difference between the first estimated position and the second estimated position satisfies a threshold, and after determining the difference does not satisfy the threshold, generate an alert indicating a discrepancy in the steering column assembly.

Example 3 includes the apparatus of example 2, wherein the first sensor is a mechanical sensor disposed on at least one of the first portion or the second portion.

Example 4 includes the apparatus of example 2, further including a motor to move the first portion relative to the second portion and wherein the second sensor is a Hall-effect sensor associated with the motor.

Example 5 includes the apparatus of example 1, further including a motor and wherein the programmable circuitry is to determine if the steering column assembly has encountered the obstruction by at least one of instantiating or executing the machine readable instructions to determine if a parameter of the motor is within a parameter range.

Example 6 includes the apparatus of example 5, wherein the programmable circuitry is to at least one of instantiate or execute the machine readable instructions to determine, based on a temperature of the steering column assembly, the parameter range.

Example 7 includes the apparatus of example 5, wherein the parameter is a current draw of the motor.

Example 8 includes a non-transitory machine readable storage medium comprising instructions to cause programmable circuitry to at least move a first portion of a steering column assembly relative to a second portion of the steering column assembly, determine based on a sensor output that the first portion has encountered an obstruction, and after determining the first portion has encountered the obstruction, stop a movement of the first portion.

Example 9 includes the non-transitory machine readable storage medium of example 8, wherein the sensor output is a first sensor output of a first sensor, and the programmable circuitry is to determine, based on the first sensor output, a first estimated position of the first portion, determine, based on a second sensor output of a second sensor, a second estimated position of the first portion, and determine if a difference between the first estimated position and the second estimated position satisfies a threshold, and after determining the difference does not satisfy the threshold, generate an alert indicating a discrepancy in the steering column assembly.

Example 10 includes the non-transitory machine readable storage medium of example 9, wherein the first sensor is a mechanical sensor disposed on at least one of the first portion or the second portion.

Example 11 includes the non-transitory machine readable storage medium of example 9, wherein the second sensor is a Hall-effect sensor associated with a motor of the steering column assembly.

Example 12 includes the non-transitory machine readable storage medium of example 8, wherein the programmable circuitry is to determine if the steering column assembly has encountered the obstruction by determining if a parameter of a motor of the steering column assembly is within a parameter range.

Example 13 includes the non-transitory machine readable storage medium of example 12, wherein the programmable circuitry is to determine, based on a temperature of the steering column assembly, the parameter range.

Example 14 includes the non-transitory machine readable storage medium of example 12, wherein the parameter is a current draw of the motor.

Example 15 includes a method comprising moving a first portion of a steering column assembly relative to a second portion of the steering column assembly, determining based on a sensor output that the first portion has encountered an obstruction, and after determining the first portion has encountered the obstruction, stopping a movement the first portion.

Example 16 includes the method of example 15, wherein the sensor output is a first sensor output of a first sensor, and further including determining, based on the first sensor output, a first estimated position of the first portion, determining, based on a second sensor output of a second sensor, a second estimated position of the first portion, and determining if a difference between the first estimated position and the second estimated position satisfies a threshold, and after determining the difference does not satisfy the threshold, generating an alert indicating a discrepancy in the steering column assembly.

Example 17 includes the method of example 16, wherein the first sensor is a mechanical sensor disposed on at least one of the first portion or the second portion, and the second sensor is a Hall-effect sensor associated with a motor of the steering column assembly.

Example 18 includes the method of example 15, wherein the determining if the steering column assembly has encountered the obstruction includes determining if a parameter of a motor of the steering column assembly is within a parameter range.

Example 19 includes the method of example 18, further including determining, based on a temperature of the steering column assembly, the parameter range.

Example 20 includes the method of example 18, wherein the parameter is a current draw of the motor. The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
- a steering column assembly including:
  - a current sensor;
  - a position sensor;
  - a first portion; and
  - a second portion moveable relative to the first portion;
- machine readable instructions; and
- programmable circuitry to at least one of instantiate or execute the machine readable instructions to:
  - cause a motor to move the first portion relative to the second portion;
  - determine that the first portion has encountered an obstruction based on position data from the position sensor and current data from the current sensor, the current data not corresponding to an inrush event of the motor; and
  - after determining the first portion has encountered the obstruction, stop a movement of the first portion.

2. The apparatus of claim 1, wherein the programmable circuitry is to at least one of instantiate or execute the machine readable instructions to:
- determine, based on the position data, a first estimated position of the first portion;
- determine, based on the current data, a second estimated position of the first portion;
- determine if a difference between the first estimated position and the second estimated position satisfies a threshold; and
- after determining the difference does not satisfy the threshold, generate an alert indicating a discrepancy in the steering column assembly.

3. The apparatus of claim 1, wherein the first position sensor is a mechanical sensor disposed on at least one of the first portion or the second portion.

4. The apparatus of claim 1, wherein the position sensor is a Hall-effect sensor associated with the motor.

5. The apparatus of claim 1, wherein the programmable circuitry is to at least one of instantiate or execute the machine readable instructions to determine if the steering column assembly has encountered the obstruction further based on if a parameter of the motor is within a parameter range.

6. The apparatus of claim 5, wherein the programmable circuitry is to at least one of instantiate or execute the machine readable instructions to determine, based on a temperature of the steering column assembly, the parameter range.

7. The apparatus of claim 5, wherein the parameter is a current draw of the motor.

8. A non-transitory machine readable storage medium comprising instructions to cause programmable circuitry to at least:
- cause a motor to move a first portion of a steering column assembly relative to a second portion of the steering column assembly;
- determine based on a position data of from a position sensor and current data from a current sensor, the current data not corresponding to an inrush event of the motor that the first portion has encountered an obstruction; and
- after determining the first portion has encountered the obstruction, stop a movement of the first portion.

9. The non-transitory machine readable storage medium of claim 8, wherein the programmable circuitry is to:
- determine, based on the position data, a first estimated position of the first portion;
- determine, based on the current data, a second estimated position of the first portion;
- determine if a difference between the first estimated position and the second estimated position satisfies a threshold; and
- after determining the difference does not satisfy the threshold, generate an alert indicating a discrepancy in the steering column assembly.

10. The non-transitory machine readable storage medium of claim 8, wherein the position sensor is a mechanical sensor disposed on at least one of the first portion or the second portion.

11. The non-transitory machine readable storage medium of claim 8, wherein the position sensor is a Hall-effect sensor associated with a motor of the steering column assembly.

12. The non-transitory machine readable storage medium of claim 8, wherein the programmable circuitry is to determine if the steering column assembly has encountered the obstruction by determining if a parameter of the motor of the steering column assembly is within a parameter range.

13. The non-transitory machine readable storage medium of claim 12, wherein the programmable circuitry is to determine, based on a temperature of the steering column assembly, the parameter range.

14. The non-transitory machine readable storage medium of claim 12, wherein the parameter is a current draw of the motor.

15. A method comprising:

causing a motor to move a first portion of a steering column assembly relative to a second portion of the steering column assembly;

determining based on position data from a position sensor and current data from a current sensor, the current data not corresponding to an inrush event of the motor that the first portion has encountered an obstruction; and after determining the first portion has encountered the obstruction, stopping a movement of the first portion.

16. The method of claim 15, further including:

determining, based on the position data, a first estimated position of the first portion;

determining, based on the current data, a second estimated position of the first portion;

determining if a difference between the first estimated position and the second estimated position satisfies a threshold; and after determining the difference does not satisfy the threshold, generating an alert indicating a discrepancy in the steering column assembly.

17. The method of claim 16, wherein the position sensor is a mechanical sensor disposed on at least one of the first portion or the second portion.

18. The method of claim 15, wherein the determining if the steering column assembly has encountered the obstruction includes determining if a parameter of the motor of the steering column assembly is within a parameter range.

19. The method of claim 18, further including determining, based on a temperature of the steering column assembly, the parameter range.

20. The method of claim 18, wherein the parameter is a current draw of the motor.

* * * * *